(12) United States Patent
Oda et al.

(10) Patent No.: US 8,822,630 B2
(45) Date of Patent: Sep. 2, 2014

(54) POLYAMIDE COMPOSITION

(75) Inventors: Takafumi Oda, Kanagawa (JP); Ryoji Otaki, Kanagawa (JP); Kentaro Ishii, Kanagawa (JP); Shota Arakawa, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/997,809

(22) PCT Filed: Dec. 20, 2011

(86) PCT No.: PCT/JP2011/079566
§ 371 (c)(1),
(2), (4) Date: Jun. 25, 2013

(87) PCT Pub. No.: WO2012/090797
PCT Pub. Date: Jul. 5, 2012

(65) Prior Publication Data
US 2013/0303367 A1 Nov. 14, 2013

(30) Foreign Application Priority Data
Dec. 27, 2010 (JP) ................................ 2010-290408

(51) Int. Cl.
*C08G 69/36* (2006.01)
(52) U.S. Cl.
USPC ........................................................ 528/310
(58) Field of Classification Search
USPC ................... 528/310, 328, 346, 381
See application file for complete search history.

(56) References Cited

U.S. PATENT DOCUMENTS

| | | | |
|---|---|---|---|
| 3,721,682 | A | 3/1973 | Murai et al. |
| 2012/0302723 | A1 | 11/2012 | Oda et al. |
| 2013/0041128 | A1 | 2/2013 | Oda et al. |
| 2013/0066040 | A1 | 3/2013 | Oda et al. |
| 2013/0109832 | A1 | 5/2013 | Oda et al. |

FOREIGN PATENT DOCUMENTS

| | | |
|---|---|---|
| JP | 2 72851 | 3/1990 |
| JP | 4 90848 | 3/1992 |
| JP | 5 115776 | 5/1993 |
| JP | 2991437 | 12/1999 |
| JP | 2002 241608 | 8/2002 |

OTHER PUBLICATIONS

U.S. Appl. No. 14/128,988, filed Dec. 27, 2013, Arakawa, et al.
U.S. Appl. No. 14/129,198, filed Dec. 24, 2013, Oda, et al.
Arvanitoyannis, I. et al., "Novel copolyamides based on adipic acid, 1,6-hexanediamine and alpha-amino acids: 2. Study of properties and their biodegradability for food-packaging applications", Polymer, vol. 36, No. 15, pp. 2957 to 2967, (1995).
Arvanitoyannis, I. et al., "Biodegradable Plastics and Polymers", Studies in Polymer Science 12, pp. 562 to 569, (1994).
International Search Report Issued Mar. 19, 2012 in PCT/JP11/79566 Filed Dec. 20, 2011.

*Primary Examiner* — Gregory Listvoyb
(74) *Attorney, Agent, or Firm* — Oblon, Spivak, McClelland, Maier & Neustadt, L.L.P.

(57) ABSTRACT

A polyamide composition containing a polyamide compound (A) and a transition metal compound (B), wherein the polyamide compound (A) contains: from 25 to 50 mol % of a diamine unit, which contains at least one diamine unit selected from the group consisting of an aromatic diamine unit represented by the following formula (I-1), an alicyclic diamine unit represented by the following formula (I-2) and a linear aliphatic diamine unit represented by the following formula (I-3), in an amount in total of 50% by mol or more; from 25 to 50 mol % of a dicarboxylic acid unit, which contains a linear aliphatic dicarboxylic acid unit represented by the following formula (II-1) and/or an aromatic dicarboxylic acid unit represented by the following formula (II-2), in an amount in total of 50% by mol or more; and from 0.1 to 50 mol % of a constitutional unit represented by the following formula (III):

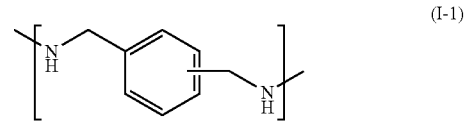

(I-1)

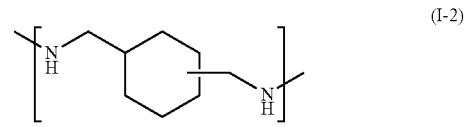

(I-2)

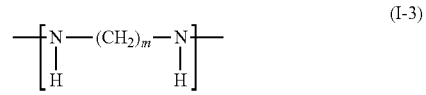

(I-3)

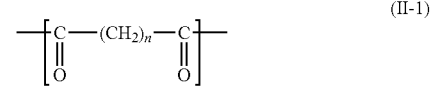

(II-1)

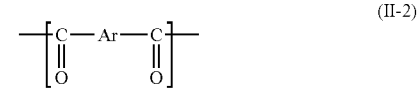

(II-2)

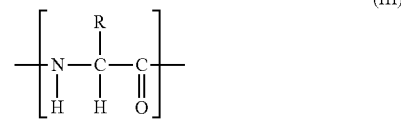

(III)

wherein m represents an integer of from 2 to 18, n represents from 2 to 18, Ar represents an arylene group, and R represents a substituted or unsubstituted alkyl group or a substituted or unsubstituted aryl group.

11 Claims, No Drawings

POLYAMIDE COMPOSITION

TECHNICAL FIELD

The present invention relates to a polyamide composition capable of expressing oxygen absorption performance.

BACKGROUND ART

Heretofore, metal cans, glass bottles, or containers or shapes of thermoplastic resin and the like are used as packaging materials for drugs, drinks, foods, chemicals, etc. Above all, containers and shapes of thermoplastic resin excel any others in their lightweightness, formability, packages producibility such as sealability, and cost, and are used most popularly. However, in general, containers and shapes of thermoplastic resin are excellent as packaging materials but have some problems in point of their storability for the contents therein since oxygen penetration through the container wall thereof occurs on a non-negligible order level.

For preventing oxygen penetration from the outside thereof, the containers and the shapes of thermoplastic resin are so planned that the container wall could have a multilayer structure, at least one layer of which is an oxygen barrier layer of polymetaxylylenadipamide (hereinafter referred to as "N-MXD6"), ethylene/vinyl alcohol copolymer, polyacrylonitrile, aluminium foil or the like. However, it is still impossible to fully prevent even slight oxygen from penetrating into the containers from outside, and is also impossible to prevent the contents sensible to oxygen such as beer or the like from being deteriorated by oxygen remaining in the containers.

For removing oxygen from containers, an oxygen absorbent has been used in the past. For example, PTL 1 and PTL 2 describe an oxygen-absorbing multilayer structure and an oxygen-absorbing film with an oxygen absorbent such as iron powder or the like dispersed in resin. PTL 3 describes an oxygen-collecting barrier for packaging capable of absorbing oxygen inside and outside a container formed of a polymer material such as polyamide or the like with a metallic catalyst such as cobalt or the like added thereto. PTL 4 describes a product having an oxygen-scavenging layer that contains an ethylenic unsaturated compound such as polybutadiene or the like and a transition metal catalyst such as cobalt or the like, and an oxygen-blocking layer of polyamide or the like.

CITATION LIST

Patent Literature

PTL 1: JP-A 2-72851
PTL 2: JP-A 4-90848
PTL 3: Japanese Patent 2991437
PTL 4: JP-A 5-115776

SUMMARY OF INVENTION

Technical Problem

The oxygen-absorbing multilayer structure and the oxygen-absorbing film with an oxygen absorbent such as iron powder or the like dispersed in resin are nontransparent since the resin is colored with the oxygen absorbent such as iron powder or the like therein, and are therefore constrained in point of the use thereof in that they could not be used in the field of packaging that requires transparency.

The problem to be solved by the present invention is to provide a polyamide composition capable of expressing sufficient oxygen absorption performance without worsening the transparency of the resin therein.

Solution to Problem

The present invention provides a polyamide composition mentioned below.

A polyamide composition containing a polyamide compound (A) and a transition metal compound (B),
wherein the polyamide compound (A) comprises:
from 25 to 50% by mol of a diamine unit, which contains at least one diamine unit selected from the group consisting of an aromatic diamine unit represented by the following general formula (I-1), an alicyclic diamine unit represented by the following general formula (I-2) and a linear aliphatic diamine unit represented by the following general formula (I-3), in an amount in total of 50% by mol or more;
from 25 to 50% by mol of a dicarboxylic acid unit, which contains a linear aliphatic dicarboxylic acid unit represented by the following general formula (II-1) and/or an aromatic dicarboxylic acid unit represented by the following general formula (II-2), in an amount in total of 50% by mol or more; and
from 0.1 to 50% by mol of a constitutional unit represented by the following general formula (III):

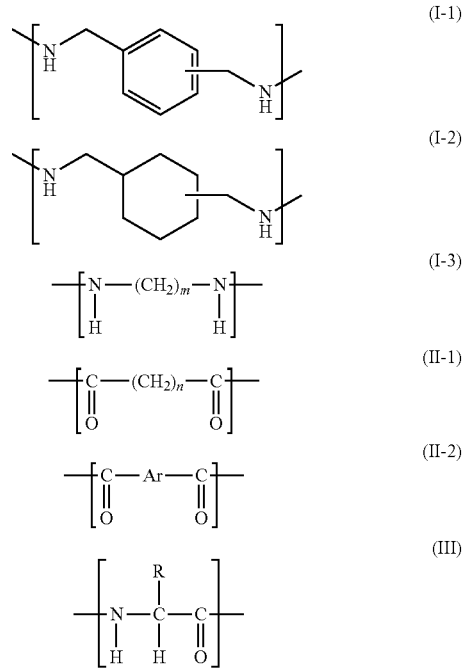

wherein,
in the general formula (I-3), m represents an integer of from 2 to 18;
in the general formula (II-1), n represents an integer of from 2 to 18;
in the general formula (II-2), Ar represents an arylene group; and
in the general formula (III), R represents a substituted or unsubstituted alkyl group or a substituted or unsubstituted aryl group.

Advantageous Effects of Invention

The polyamide composition of the present invention is excellent in oxygen absorption performance. Accordingly, for example, the polyamide composition of the present invention is favorable for use as an oxygen absorbent, as capable of being filled in pouches or the like. A more preferred embodiment of using the polyamide composition of the present invention is using it in packaging materials and packaging containers. The packaging materials and packaging containers using the polyamide composition of the present invention can express sufficient oxygen absorption performance not worsening the transparency of the resin constituting it, and can store the contents therein in a good condition.

DESCRIPTION OF EMBODIMENTS

1. Polyamide Compound (A)

The polyamide compound (A) for use in the present invention contains: from 25 to 50% by mol of a diamine unit, which contains at least one diamine unit selected from the group consisting of an aromatic diamine unit represented by the following general formula (I-1), an alicyclic diamine unit represented by the following general formula (I-2) and a linear aliphatic diamine unit represented by the following general formula (I-3), in an amount in total of 50% by mol or more; from 25 to 50% by mol of a dicarboxylic acid unit, which contains a linear aliphatic dicarboxylic acid unit represented by the following general formula (II-1) and/or an aromatic dicarboxylic acid unit represented by the following general formula (II-2) in an amount in total of 50% by mol or more; and from 0.1 to 50% by mol of a tertiary hydrogen-containing carboxylic acid unit (preferably a constitutional unit represented by the following general formula (III)):

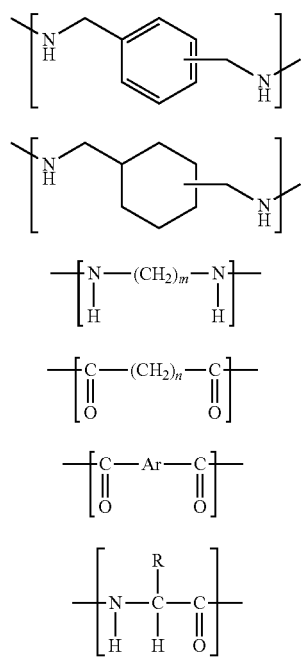

wherein, in the general formula (I-3), m represents an integer of from 2 to 18; in the general formula (II-1), n represents an integer of from 2 to 18; in the general formula (II-2), Ar represents an arylene group; and in the general formula (III), R represents a substituted or unsubstituted alkyl group or a substituted or unsubstituted aryl group.

The total of the diamine unit, the dicarboxylic acid unit and the tertiary hydrogen-containing carboxylic acid unit should not exceed 100% by mol. The polyamide compound (A) may contain any other constitutional unit than the above, within a range not detracting from the advantage of the present invention.

The polyamide compound (A) for use in the present invention includes a polyamide resin and a polyamide oligomer.

The "polyamide resin" for use in the present invention means a polymer having a relative viscosity of 1.8 or more of the polyamide compound (A) in the present invention. The polyamide resin is a material capable of being worked and formed by itself, and can be worked and formed into packaging materials and packaging containers. If desired, any other resin and additive may be added to and mixed in the polyamide resin for use in the present invention, and the polyamide composition thus obtained can be worked and formed. The polyamide resin for use in the present invention can express sufficient oxygen absorption performance even though not containing a metal, and does not generate any offensive odor, and can have an extremely good transparency.

The "polyamide oligomer" for use in the present invention means a polymer having a relative viscosity of less than 1.8 of the polyamide compound (A) in the present invention. The polyamide oligomer is a material that cannot be worked and formed by itself. In many cases in general, an oligomer represents a polymer having a number-average molecular weight of 1,000 or less, but the polyamide oligomer for use in the present invention includes not only such an ordinary oligomer but also a polymer having a number-average molecular weight of less than 10,000. The polyamide oligomer for use in the present invention can express sufficient oxygen absorption performance even though not containing a metal, and does not generate any offensive odor, and can have an extremely good transparency.

In case where the polyamide compound (A) in the present invention is a polyamide oligomer, the polyamide composition of the present invention is favorable for use as an oxygen absorbent, as capable of being filled in pouches or the like. In addition, the polyamide composition of the present invention is favorably used as a resin material or a resin additive. In case where the polyamide composition of the present invention is used as a resin material, the polyamide oligomer therein may be copolymerized with any other resin material to give a copolymer resin, and the copolymer resin may be worked and formed into packaging materials or packaging containers. In case where the polyamide composition of the present invention is used as a resin additive, the polyamide oligomer therein may be added to a resin to give a polyamide composition, which may be worked and formed into packaging materials or packaging containers. In this case, the polyamide composition can express sufficient oxygen absorption performance not detracting from the transparency and the mechanical strength of the resin therein.

In the polyamide compound (A), the content of the tertiary hydrogen-containing carboxylic acid unit is from 0.1 to 50% by mol. When the content of the tertiary hydrogen-containing carboxylic acid unit is less than 0.1% by mol, then the compound could not express sufficient oxygen absorption performance. On the other hand, when the content of the tertiary hydrogen-containing carboxylic acid unit is more than 50% by mol, then the tertiary hydrogen content is too high, and if so, the physical properties such as the gas barrier property and the mechanical properties of the polyamide compound (A) may worsen; and in particular, when the tertiary hydrogen-containing carboxylic acid is an amino acid, then not only the heat resistance of the compound is poor since peptide bonds continue therein but also a cyclic product of a dimer of the amino acid is formed to interfere with polymerization. From the viewpoint of the oxygen absorption performance and other properties of the polyamide compound (A), the content of the tertiary hydrogen-containing carboxylic acid unit is preferably 0.2% by mol or more, more preferably 1% by mol or more, and is preferably 40% by mol or less, more preferably 30% by mol or less.

In the polyamide compound (A), the content of the diamine unit is from 25 to 50% by mol, and from the viewpoint of the oxygen absorption performance and the polymer properties, the content is preferably from 30 to 50% by mol. Similarly, in the polyamide compound (A), the content of the dicarboxylic acid unit is from 25 to 50% by mol, preferably from 30 to 50% by mol.

Preferably, the content of the diamine unit and the content of the dicarboxylic acid unit is nearly the same, and more preferably, the content of the dicarboxylic acid unit is ±2% by mol of the content of the diamine unit. When the content of the dicarboxylic acid unit is more than the range of ±2% by mol of the content of the diamine unit, then the degree of polymerization of the polyamide compound (A) is difficult to increase and therefore, much time is needed for increasing the degree of polymerization of the compound and the compound is thereby often thermally degraded.

1-1. Diamine Unit

The diamine unit in the polyamide compound (A) contains at least one diamine unit selected from the group consisting of an aromatic diamine unit represented by the general formula (I-1), an alicyclic diamine unit represented by the general formula (I-2) and a linear aliphatic diamine unit represented by the general formula (I-3) in an amount in total of 50% by mol or more in the diamine unit; and the content is preferably 70% by mol or more, more preferably 80% by mol or more, even more preferably 90% by mol or more, and is preferably 100% by mol or less.

The compound capable of constituting the aromatic diamine unit represented by the general formula (I-1) includes o-xylylenediamine, m-xylylenediamine, and p-xylylenediamine. One or more of these may be used here either singly or as combined.

The compound capable of constituting the alicyclic diamine unit represented by the general formula (I-2) includes bis(aminomethyl)cyclohexanes such as 1,3-bis(aminomethyl)cyclohexane, 1,4-bis(aminomethyl)cyclohexane. One or more of these may be used here either singly or as combined.

Bis(aminomethyl)cyclohexanes have structural isomers. Those having a higher cis-isomer ratio have high crystallinity and have good formability. On the other hand, those having a lower cis-isomer ratio give transparent shapes having low crystallinity. Accordingly, in case where the intended shapes are desired to have a high crystallinity, the cis-isomer content ratio in the bis(aminomethyl)cyclohexanes is preferably 70% by mol or more, more preferably 80% by mol or more, even more preferably 90% by mol or more. On the other hand, when the shapes are desired to have a low crystallinity, then the cis-isomer content ratio in the bis(aminomethyl)cyclohexanes is preferably 50% by mol or less, more preferably 40% by mol or less, even more preferably 30% by mol or less.

In the general formula (I-3), m represents an integer of from 2 to 18, preferably from 3 to 16, more preferably from 4 to 14, even more preferably from 6 to 12.

Examples of the compound capable of constituting the linear aliphatic diamine unit represented by the general formula (I-3) include aliphatic diamines such as ethylenediamine, N-methylethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, etc., to which, however, the compound is not limited. Of those, preferred is hexamethylenediamine. One alone or two or more of these may be used here either alone or as combined.

Preferably, the diamine unit in the polyamide compound (A) contains the aromatic diamine unit represented by the general formula (I-1) and/or the alicyclic diamine unit represented by the general formula (I-2), from the viewpoint of making the polyamide composition of the present invention have an excellent gas barrier property and, in addition, from the viewpoint of enhancing the transparency and the discoloration resistance of the composition and facilitating the formability of ordinary thermoplastic resins; but from the viewpoint of imparting suitable crystallinity to the polyamide composition of the present invention, the compound preferably contains the linear aliphatic diamine unit represented by the general formula (I-3). In particular, from the viewpoint of the oxygen absorption performance and the physical properties of the polyamide composition of the present invention, the compound preferably contains the aromatic diamine unit represented by the general formula (I-1).

The diamine unit in the polyamide compound (A) preferably contains a m-xylylenediamine unit in an amount of 50% by mol or more from the viewpoint of making the polyamide composition of the present invention express an excellent gas barrier property and, in addition, from the viewpoint of facilitating the formability of ordinary thermoplastic resins; and more preferably, the content is 70% by mol or more, even more preferably 80% by mol or more, still more preferably 90% by mol or more, and is preferably 100% by mol or less.

Examples of the compound capable of constituting the other diamine unit than the diamine units represented by any of the above-mentioned formulae (I-1) to (1-3) include aromatic diamines such as paraphenylenediamine, etc.; alicyclic diamines such as 1,3-diaminocyclohexane, 1,4-diaminocyclohexane, etc.; aliphatic diamines such as 2-methyl-1,5-pentanediamine, 1-imino-3-aminomethyl-3,5,5-trimethylcyclohexane, etc.; ether bond-containing polyether diamines such as typically Huntsman's Jeffamine and Elastamine (both trade names), etc., to which, however, the present invention is not limited. One alone or two or more different types of these may be used here either singly or as combined.

1-2. Dicarboxylic Acid Unit

The dicarboxylic acid unit in the polyamide compound (A) contains the linear aliphatic dicarboxylic acid unit represented by the general formula (II-1) and/or the aromatic dicarboxylic acid unit represented by the general formula (II-2) in an amount in total of 50% by mol or more in the dicarboxylic acid unit, from the viewpoint of the reactivity in polymerization and the crystallinity and the formability of the polyamide compound (A); and the content is preferably 70% by mol or more, more preferably 80% by mol or more, even more preferably 90% by mol or more, and is preferably 100% by mol or less.

The compound capable of constituting the other dicarboxylic acid unit than the dicarboxylic acid unit represented by the general formula (II-1) or (II-2) includes dicarboxylic acids such as oxalic acid, malonic acid, fumaric acid, maleic acid, 1,3-benzene-diacetic acid, 1,4-benzene-diacetic acid, etc., to which, however, the present invention is not limited.

In the dicarboxylic acid unit in the polyamide compound (A), the content ratio of the linear aliphatic dicarboxylic acid unit to the aromatic dicarboxylic acid unit (linear aliphatic dicarboxylic acid unit/aromatic dicarboxylic acid unit) is not specifically defined, and may be suitably determined depending on the intended use. For example, in case where the glass transition temperature of the polyamide compound (A) is desired to be elevated and the crystallinity of the polyamide compound (A) is thereby desired to be lowered, the ratio of linear aliphatic dicarboxylic acid unit/aromatic dicarboxylic acid unit is preferably from 0/100 to 60/40 relative to the total of the two, 100, and is more preferably from 0/100 to 40/60, even more preferably from 0/100 to 30/70. In case where the glass transition temperature of the polyamide compound (A) is desired to be lowered and the polyamide compound (A) is thereby desired to be more flexible, then the ratio of linear aliphatic dicarboxylic acid unit/aromatic dicarboxylic acid unit is preferably from 40/60 to 100/0 relative to the total of the two, 100, and is more preferably from 60/40 to 100/0, even more preferably from 70/30 to 100/0.

1-2-1. Linear Aliphatic Dicarboxylic Acid Unit

In case where the polyamide compound (A) is desired to impart to the polyamide composition of the present invention a suitable glass transition temperature and a suitable crystallinity, and in addition thereto, desired to impart thereto suitable flexibility necessary for packaging materials and packaging containers, then the polyamide compound (A) therein preferably contains the linear aliphatic dicarboxylic acid unit represented by the general formula (II-1).

In the general formula (II-1), n represents an integer of from 2 to 18, preferably from 3 to 16, more preferably from 4 to 12, even more preferably from 4 to 8.

The compound capable of constituting the linear aliphatic dicarboxylic acid unit represented by the general formula (II-1) includes succinic acid, glutaric acid, adipic acid, pimelic acid, suberic acid, azelaic acid, sebacic acid, 1,10-decanedicarboxylic acid, 1,11-undecanedicarboxylic acid, 1,12-dodecanedicarboxylic acid, etc., to which, however, the present invention is not limited. One alone or two or more of these may be used here either singly or as combined.

The type of the linear aliphatic dicarboxylic acid unit represented by the general formula (II-1) can be suitably determined depending on the intended use thereof. The linear aliphatic dicarboxylic acid unit in the polyamide compound (A) preferably contains at least one selected from a group consisting of an adipic acid unit, a sebacic acid unit and a 1,12-dodecanedicarboxylic acid unit in an amount of 50% by mol in total in the linear aliphatic dicarboxylic acid unit, from the viewpoint of giving an excellent gas barrier property to the polyamide composition of the present invention and, in addition thereto, from the viewpoint that the packaging materials and the packaging containers formed of the polyamide composition can still keep heat resistance after thermal sterilization thereof; and the content is more preferably 70% by mol or more, even more preferably 80% by mol or more, still more preferably 90% by mol or more, and is preferably 100% by mol or less.

The linear aliphatic dicarboxylic acid unit in the polyamide compound (A) preferably contains an adipic acid unit in an amount of 50% by mol or more in the linear aliphatic dicarboxylic acid unit from the viewpoint of the gas barrier property of the polyamide composition of the present invention and of suitable thermal properties such as suitable glass transition temperature or melting point thereof. The linear aliphatic dicarboxylic acid unit in the polyamide compound (A) preferably contains a sebacic acid unit in an amount of 50% by mol or more in the linear aliphatic dicarboxylic acid unit from the viewpoint of giving a suitable gas barrier property and forming workability to the polyamide composition of the present invention; and in case where the polyamide composition of the present invention is used for those that are required to have low water absorbability, weatherability and heat resistance, the linear aliphatic dicarboxylic acid unit preferably contains a 1,12-dodecanedicarboxylic acid unit in an amount of 50% by mol or more therein.

1-2-2. Aromatic Dicarboxylic Acid Unit

The polyamide compound (A) preferably contains the aromatic dicarboxylic acid unit represented by the general formula (II-2) in order that the polyamide composition of the present invention is given a better gas barrier property and, in addition thereto, in order that the composition could be easily worked and formed into packaging materials and packaging containers.

In the general formula (II-2), Ar represents an arylene group. The arylene group is preferably an arylene group having from 6 to 30 carbon atoms, more preferably from 6 to 15 carbon atoms, including, for example, a phenylene group, a naphthylene group, etc.

The compound capable of constituting the aromatic dicarboxylic acid unit represented by the general formula (II-2) includes terephthalic acid, isophthalic acid, 2,6-naphthalenedicarboxylic acid, etc., to which, however, the present invention is not limited. One alone or two or more of these can be used here either singly or as combined.

The type of the aromatic dicarboxylic acid unit represented by the general formula (II-2) can be suitably determined depending on the intended use thereof. The aromatic dicarboxylic acid unit in the polyamide compound (A) preferably contains at least one selected from a group consisting of an isophthalic acid unit, a terephthalic acid unit and a 2,6-naphthalenedicarboxylic acid unit in an amount of 50% by mol in total in the aromatic dicarboxylic acid unit; and the content is more preferably 70% by mol or more, even more preferably 80% by mol or more, still more preferably 90% by mol or more, and is preferably 100% by mol or less. Of those, isophthalic acid and/or terephthalic acid are more preferably contained in the aromatic dicarboxylic acid unit. The content ratio of the isophthalic acid unit to the terephthalic acid unit (isophthalic acid unit/terephthalic acid unit) is not specifically defined, and may be suitably determined depending on the intended use. For example, from the viewpoint of suitably lowering the glass transition temperature and the crystallinity of the compound, the ratio is preferably from 0/100 to 100/0 relative to the total of the two units, 100, more preferably from 0/100 to 60/40, even more preferably from 0/100 to 40/60, still more preferably from 0/100 to 30/70.

1-3. Tertiary Hydrogen-Containing Carboxylic Acid Unit

The tertiary hydrogen-containing carboxylic acid unit in the present invention has at least one amino group and at least one carboxyl group or has at least two carboxyl groups from the viewpoint of polymerization to form the polyamide compound (A). As specific examples, there are mentioned constitutional units represented by any of the following general formula (III), (IV) or (V):

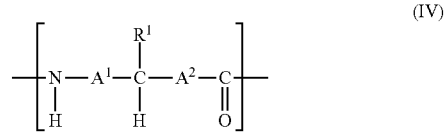

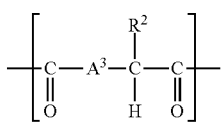

[In the general formulae (III) to (V), R, $R^1$ and $R^2$ each represent a substituent, and $A^1$ to $A^3$ each represent a single bond or a divalent linking group. However, the general formula (IV) excludes a case where $A^1$ and $A^2$ are both single bonds.]

The polyamide compound (A) contains a tertiary hydrogen-containing carboxylic acid unit. Containing such a tertiary hydrogen-containing carboxylic acid unit as the copolymerization component thereof, the polyamide compound (A) can exhibit excellent oxygen absorption performance even though not containing a transition metal.

In the present invention, the mechanism that the polyamide compound (A) having a tertiary hydrogen-containing carboxylic acid unit could realize good oxygen absorption performance would be, though not clarified as yet, considered as follows: In the compound capable of constituting a tertiary hydrogen-containing carboxylic acid unit, an electron-withdrawing group and an electron-donating group bond to one and the same carbon atom, and therefore, owing to the phenomenon that is called a captodative effect of energically stabilizing the unpaired electrons existing on that carbon atom, an extremely stable radical could be formed. Specifically, a carboxyl group is an electron-withdrawing group, and since the carbon atom adjacent to the group, to which a tertiary hydrogen atom bonds, is an electron-poor ($\delta^+$) one, the tertiary hydrogen atom also becomes an electron-poor ($\delta^+$) one, therefore forming a radical as dissociated as a proton. In case where oxygen and water exist in this state, oxygen could react with the radical and therefore the compound could exhibit oxygen absorption performance. In this connection, it has been known that in an environment having a higher humidity and a higher temperature, the reactivity is higher.

In the general formulae (III) to (V), R, $R^1$ and $R^2$ each represent a substituent. The substituent represented by R, $R^1$ and $R^2$ in the present invention includes a halogen atom (e.g., a chlorine atom, a bromine atom, an iodine atom), an alkyl group (a linear, branched or cyclic alkyl group having from 1 to 15, preferably from 1 to 6 carbon atoms, for example, a methyl group, an ethyl group, an n-propyl group, an isopropyl group, a t-butyl group, an n-octyl group, a 2-ethylhexyl group, a cyclopropyl group, a cyclopentyl group), an alkenyl group (a linear, branched or cyclic alkenyl group having from 2 to 10, preferably from 2 to 6 carbon atoms, for example, a vinyl group, an allyl group), an alkynyl group (an alkynyl group having from 2 to 10, preferably from 2 to 6 carbon atoms, for example, an ethynyl group, a propargyl group), an aryl group (an aryl group having from 6 to 16, preferably from 6 to 10 carbon atoms, for example, a phenyl group, a naphthyl group), a heterocyclic group (a monovalent group having from 1 to 12, preferably from 2 to 6 carbon atoms, as derived from a 5-membered or 6-membered, aromatic or non-aromatic heterocyclic compound by removing one hydrogen atom therefrom, for example, a 1-pyrazolyl group, a 1-imidazolyl group, a 2-furyl group), a cyano group, a hydroxyl group, a nitro group, an alkoxy group (a linear, branched or cyclic alkoxy group having from 1 to 10, preferably from 1 to 6 carbon atoms, for example, a methoxy group, an ethoxy group), an aryloxy group (an aryloxy group having from 6 to 12, preferably from 6 to 8 carbon atoms, for example, a phenoxy group), an acyl group (a formyl group, an alkylcarbonyl group having from 2 to 10, preferably from 2 to 6 carbon atoms, or an arylcarbonyl group having from 7 to 12, preferably from 7 to 9 carbon atoms, for example, an acetyl group, a pivaloyl group, a benzoyl group), an amino group (an amino group, an alkylamino group having from 1 to 10, preferably from 1 to 6 carbon atoms, an anilino group having from 6 to 12, preferably from 6 to 8 carbon atoms, or a heterocyclic amino group having from 1 to 12, preferably from 2 to 6 carbon atoms, for example, an amino group, a methylamino group, an aniline group), a mercapto group, an alkylthio group (an alkylthio group having from 1 to 10, preferably from 1 to 6 carbon atoms, for example, a methylthio group, an ethylthio group), an arylthio group (an arylthio group having from 6 to 12, preferably from 6 to 8 carbon atoms, for example, a phenylthio group), a heterocyclic thio group (a heterocyclic thio group having from 2 to 10, preferably from 1 to 6 carbon atoms, for example, a 2-benzothiazolylthio group), an imido group (an imido group having from 2 to 10, preferably from 4 to 8 carbon atoms, for example, an N-succinimido group, an N-phthalimido group), etc.

Of the functional groups, those having a hydrogen atom may be further substituted with the above-mentioned group. For example, there are mentioned an alkyl group substituted with a hydroxyl group (e.g., a hydroxyethyl group), an alkyl group substituted with an alkoxy group (e.g., a methoxy group), an alkyl group substituted with an aryl group (e.g., a benzyl group), an aryl group substituted with an alkyl group (e.g., a p-tolyl group), an aryloxy group substituted with an alkyl group (e.g., a 2-methylphenoxy group), etc., to which, however, the present invention is not limited.

In case where the functional group is further substituted, the above-mentioned carbon number does not include the carbon number of the additional substituent. For example, a benzyl group is considered as an alkyl group having 1 carbon atom and substituted with a phenyl group, but is not considered as an alkyl group substituted with a phenyl group and having 7 carbon atoms. Unless otherwise specifically indicated, the same shall apply to the carbon number referred to hereinunder.

In the general formulae (IV) and (V), $A^1$ to $A^3$ each represent a single bond or a divalent linking group. However, the general formula (IV) excludes a case where $A^1$ and $A^2$ are both single bonds. The divalent linking group includes, for example, a linear, branched or cyclic alkylene group (an alkylene group having from 1 to 12, preferably from 1 to 4 carbon atoms, for example, a methylene group, an ethylene group), an aralkylene group (an aralkylene group having from 7 to 30, preferably from 7 to 13 carbon atoms, for example, a benzylidene group), an arylene group (an arylene group having from 6 to 30, preferably from 6 to 15 carbon atoms, for example, a phenylene group), etc. These may further have a substituent. The substituent may include the functional groups exemplified hereinabove for the substituents represented by R, R' and $R^2$. For example, there are mentioned an arylene group substituted with an alkyl group (for example, a xylylene group), etc., to which, however, the present invention is not limited.

Preferably, the polyamide compound (A) contains at least one of the constitutional units represented by any of the general formula (III), (IV) or (V). Of those, more preferred is a carboxylic acid unit having a tertiary hydrogen atom at the α carbon atom (carbon atom adjacent to the carboxyl group), from the viewpoint of the availability of the starting material and of the advanced oxygen absorbability of the compound; and more preferred is the constitutional unit represented by the general formula (III).

R in the general formula (III) is as mentioned above. Above all, more preferred are a substituted or unsubstituted alkyl group and a substituted or unsubstituted aryl group; even more preferred are a substituted or unsubstituted alkyl group having from 1 to 6 carbon atoms, and a substituted or unsubstituted aryl group having from 6 to 10 carbon atoms; and still more preferred are a substituted or unsubstituted alkyl group having from 1 to 4 carbon atoms, and a substituted or unsubstituted phenyl group.

Preferred examples of R include a methyl group, an ethyl group, an n-propyl group, an isopropyl group, an n-butyl group, a t-butyl group, a 1-methylpropyl group, a 2-methylpropyl group, a hydroxymethyl group, a 1-hydroxyethyl group, a mercaptomethyl group, a methylsulfanylethyl group, a phenyl group, a naphthyl group, a benzyl group, a 4-hydroxybenzyl group, etc., to which, however, the present invention is not limited. Of those, more preferred are a methyl group, an ethyl group, a 2-methylpropyl group and a benzyl group.

The compound capable of constituting the constitutional unit represented by the general formula (III) includes α-amino acids such as alanine, 2-aminobutyric acid, valine, norvaline, leucine, norleucine, tert-leucine, isoleucine, serine, threonine, cysteine, methionine, 2-phenylglycine, phenylalanine, tyrosine, histidine, tryptophane, proline, etc., to which, however, the present invention is not limited.

The compound capable of constituting the constitutional unit represented by the general formula (IV) includes β-amino acids such as 3-aminobutyric acid, etc.; and the compound capable of constituting the constitutional unit represented by the general formula (V) include dicarboxylic acids such as methylmalonic acid, methylsuccinic acid, malic acid, tartaric acid, etc., to which, however, the invention is not limited.

These may be any of a D-form, an L-form or a racemic form, and may also be an allo-form. One alone or two or more of these may be used here either singly or as combined.

Of those, more preferred is an α-amino acid having a tertiary hydrogen atom at the α carbon atom, from the viewpoint of the availability of the starting material and of the advanced oxygen absorbability of the compound. Of the α-amino acid, most preferred is alanine from the viewpoint of the availability, the cost and the polymerizability thereof and of the low yellow index (YI) of the polymer. Alanine has a relatively low molecular weight, and the copolymerization ratio thereof per gram of the polyamide compound (A) is therefore high, and accordingly, the oxygen absorption performance per gram of the polyamide compound (A) with alanine is good.

The purity of the compound capable of constituting the tertiary hydrogen-containing carboxylic acid unit is preferably 95% or more, from the viewpoint of the influence thereof on the polymerization such as delay in polymerization rate thereof as well as on the quality such as the yellow index of the polymer, and is more preferably 98.5% or more, even more preferably 99% or more. The amount of the sulfate ion and the ammonium ion to be contained in the compound as impurities therein is preferably 500 ppm or less, more preferably 200 ppm or less, even more preferably 50 ppm or less.

1-4. ω-Aminocarboxylic Acid Unit

In case where the polyamide compound (A) is needed to have flexibility, the polyamide compound may further contain an ω-aminocarboxylic acid unit represented by the following general formula (X), in addition to the above-mentioned diamine unit, dicarboxylic acid unit and tertiary hydrogen-containing carboxylic acid unit therein.

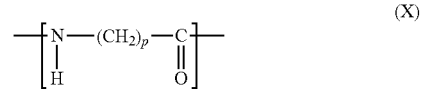

[In the general formula (X), p represents an integer of from 2 to 18.]

The content of the ω-aminocarboxylic acid unit is preferably from 0.1 to 49.9% by mol in all the constitutional units of the polyamide compound (A), more preferably from 3 to 40% by mol, even more preferably from 5 to 35% by mol. However, the total of the diamine unit, the dicarboxylic acid unit, the tertiary hydrogen-containing carboxylic acid unit and the ω-aminocarboxylic acid unit should not exceed 100% by mol.

In the general formula (X), p represents an integer of from 2 to 18, preferably from 3 to 16, more preferably from 4 to 14, even more preferably from 5 to 12.

The compound capable of constituting the ω-aminocarboxylic acid unit represented by the general formula (X) includes an ω-aminocarboxylic acid having from 5 to 19 carbon atoms, and a lactam having from 5 to 19 carbon atoms. The ω-aminocarboxylic acid having from 5 to 19 carbon atoms includes 6-aminohexanoic acid, 12-aminododecanoic acid, etc.; and the lactam having from 5 to 19 carbon atoms includes ε-caprolactam and laurolactam, to which, however, the present invention is not limited. One alone or two or more of these may be used here either singly or as combined.

Preferably, the ω-aminocarboxylic acid unit contains a 6-aminohexanoic acid unit and/or a 12-aminododecanoic acid unit in an amount in total of 50% by mol or more in the ω-aminocarboxylic acid unit; and the content is more preferably 70% by mol or more, even more preferably 80% by mol or more, still more preferably 90% by mol or more, and is preferably 100% by mol or less.

1-5. Degree of Polymerization of Polyamide Compound (A)

For the degree of polymerization of the polyamide compound (A), used is a relative viscosity thereof. The relative viscosity of the polyamide compound (A) is preferably from 1.01 to 4.2.

In case where the polyamide compound (A) is a polyamide resin, the relative viscosity thereof is preferably from 1.8 to 4.2 from the viewpoint of the outward appearance of the shapes thereof and of the forming workability thereof, more preferably from 1.9 to 4.0, even more preferably from 2.0 to 3.8. However, in case where the polyamide composition of the present invention is used as an additive, a modifier or the like for other thermoplastic resins, the range should not apply thereto.

In case where the polyamide compound (A) is a polyamide oligomer, the relative viscosity thereof is preferably from 1.01 to less than 1.80 from the viewpoint of the handleability, the reactivity and the thermal stability thereof, more preferably from 1.1 to 1.75, even more preferably from 1.2 to 1.65, still more preferably from 1.3 to 1.6.

The relative viscosity as referred to herein is as follows: One gram of the polyamide compound is dissolved in 100 mL of 96% sulfuric acid, and using a Canon Fenske-type viscometer, the dropping time (t) thereof is measured at 25° C. The dropping time ($t_0$) of 96% sulfuric acid is also measured in the same manner, and the relative viscosity of the compound is represented by the following ratio.

Relative Viscosity=$t/t_0$ 1-6. Terminal Amino Group Concentration

The oxygen absorption rate of the polyamide composition of the present invention and the oxidative deterioration of the polyamide composition owing to oxygen absorption can be controlled by changing the terminal amino group concentration of the polyamide compound (A). In case where the polyamide compound (A) is a polyamide resin, the terminal amino group concentration thereof is preferably from 5 to 150 µeq/g from the viewpoint of the balance between the oxygen absorption rate and the oxidative deterioration thereof, more preferably from 10 to 100 µeq/g, even more preferably from 15 to 80 µeq/g.

In the present invention, in case where the terminal amino group concentration falls within the above-mentioned range, the transition metal compound to be in the polyamide composition does not provide any significant change in the oxygen absorption performance of the polyamide compound in the composition. In an oxygen-absorbing resin composition prepared by adding a transition metal compound to polymetaxylyleneadipamide according to a conventional art, when the terminal amino group concentration becomes high, then the oxygen absorption performance of the composition tends to lower; and consequently, for example, in case where the terminal amino group concentration may have some influence on the other desired performance such as yellowing resistance or the like of polyamide, then it is often impossible to satisfy both the other desired performance and the oxygen absorption performance; however, since the polyamide resin composition of the present invention can stably exhibit the oxygen absorption performance within the practicable range of the terminal amino group concentration, the composition is excellent in that the terminal amino group concentration of the polyamide compound therein can be controlled in any desired range in accordance with the other desired performance of the composition.

1-7. Production Method for Polyamide Compound (A)

The polyamide compound (A) can be produced through polycondensation of a diamine component capable of constituting the above-mentioned diamine unit, a dicarboxylic acid component capable of constituting the above-mentioned dicarboxylic acid unit, a tertiary hydrogen-containing carboxylic acid component capable of constituting the above-mentioned tertiary hydrogen-containing carboxylic acid unit, and optionally an ω-aminocarboxylic acid component capable of constituting the above-mentioned ω-aminocarboxylic acid unit, in which the degree of polymerization can be controlled by controlling the polycondensation condition. A small amount of a monoamine or a monocarboxylic acid, serving as a molecular weight regulating agent, may be added to the system during polycondensation. In order to control the polycondensation reaction and to make the produced polymer have a desired degree of polymerization, the ratio (by mol) of the diamine component to the carboxylic acid component to constitute the polyamide compound may be deviated from 1.

The polycondensation method for the polyamide compound (A) includes a reactive extrusion method, a pressurized salt method, a normal-pressure instillation method, a pressurized instillation method, etc., to which, however, the present invention is not limited. Preferably, the reaction temperature is as low as possible, since the polyamide compound can be prevented from yellowing or gelling and can have stable properties.

1-7-1. Reactive Extrusion Method

The reactive extrusion method is a method of reacting a polyamide comprising a diamine component and a dicarboxylic acid component (a polyamide corresponding to the precursor of the polyamide compound (A)) or a polyamide comprising a diamine component, a dicarboxylic acid component and an ω-aminocarboxylic acid component (a polyamide corresponding to the precursor of the polyamide compound (A)) with a tertiary hydrogen-containing carboxylic acid component by melt-kneading them in an extruder. This is a method of incorporating the tertiary hydrogen-containing carboxylic acid component into the skeleton of the polyamide through interamidation reaction. Preferably, a screw suitable to reactive extrusion is used and a double-screw extruder having a large L/D is used for fully attaining the reaction. This method is simple and is favorable for producing a polyamide compound that contains a small amount of a tertiary hydrogen-containing carboxylic acid component.

1-7-2. Pressurized Salt Method

The pressurized salt method is a method of melt polycondensation under pressure, starting from a nylon salt as the starting material. Concretely, an aqueous solution of a nylon salt comprising a diamine component, a dicarboxylic acid component, a tertiary hydrogen-containing carboxylic acid component and optionally an ω-aminocarboxylic acid component is prepared, and thereafter the aqueous solution is concentrated and heated under pressure for polycondensation with removing the condensation water. Inside the reactor, while the pressure is gradually restored to normal pressure, the system is heated up to around a temperature of (melting point+10° C.) of the polyamide compound and kept as such, and thereafter the inner pressure is gradually reduced to 0.02 MPaG and kept as such at the temperature to continue the polycondensation. After the system has reached a predetermined stirring torque, the reactor was pressurized with nitrogen up to 0.3 MPaG or so and the polyamide compound is then collected.

The pressurized salt method is useful in a case where a volatile component is used as the monomer, and is a preferred polycondensation method for the case where the copolymerization ratio of the tertiary hydrogen-containing carboxylic acid component is high. In particular, the method is favorable for the case where the tertiary hydrogen-containing carboxylic acid component accounts for 15% by mol or more of all the components to constitute the polyamide compound (A). According to the pressurized salt method, the tertiary hydrogen-containing carboxylic acid component can be prevented from evaporating away, and further, polycondensation of the tertiary hydrogen-containing carboxylic acid component alone can be prevented, and accordingly, the polycondensation reaction can be carried out smoothly and the polyamide compound produced can have excellent properties.

1-7-3. Normal-Pressure Instillation Method

The normal-pressure instillation method is a method where a diamine component is continuously added dropwise to a mixture prepared by heating and melting a dicarboxylic acid component, a tertiary hydrogen-containing carboxylic acid component and optionally an ω-aminocarboxylic acid component, under normal pressure for polycondensation with removing the condensation water. During the polycondensation reaction, the reaction system is heated in order that the reaction temperature is not lower than the melting point of the polyamide compound to be produced.

In the normal-pressure instillation method, the yield per batch is large as compared with that in the above-mentioned pressurized salt method, since the method does not require water for salt dissolution, and in addition, since the method does not require vaporization and condensation of the starting material components, the reaction speed lowers little and the process time can be shortened.

1-7-4. Pressurized Instillation Method

In the pressurized instillation method, first a dicarboxylic acid component, a tertiary hydrogen-containing carboxylic acid component and optionally an ω-aminocarboxylic acid component are put into the polycondensation reactor, and then the components are stirred and mixed in melt to prepare a mixture. Next, while the reactor is pressurized preferably up to from 0.3 to 0.4 MPaG or so, a diamine component is continuously added dropwise to the mixture for polycondensation with removing the condensation water. During the polycondensation reaction, the reaction system is heated in order that the reaction temperature is not lower than the melting point of the polyamide compound to be produced. After the components have reached a predetermined molar ratio, the addition of the diamine component is finished. While the reactor is gradually restored to normal pressure, the system therein is heated up to around a temperature of (melting point+10° C.) of the polyamide compound to be produced, and kept as such. Subsequently, while the reactor is gradually depressurized to 0.02 MPaG, the system therein is kept as such at the temperature to continue the polycondensation. After the system has reached a predetermined stirring torque, the reactor was pressurized with nitrogen up to 0.3 MPaG or so and the polyamide compound is then collected.

Like the pressurized salt method, the pressurized instillation method is useful in a case where a volatile component is used as the monomer, and is a preferred polycondensation method for the case where the copolymerization ratio of the tertiary hydrogen-containing carboxylic acid component is high. In particular, the method is favorable for the case where the tertiary hydrogen-containing carboxylic acid component accounts for 15% by mol or more of all the components to constitute the polyamide compound (A). According to the pressurized instillation method, the tertiary hydrogen-containing carboxylic acid component can be prevented from evaporating away, and further, polycondensation of the tertiary hydrogen-containing carboxylic acid component alone can be prevented, and accordingly, the polycondensation reaction can be carried out smoothly and the polyamide compound produced can have excellent properties. Further, different from the pressurized salt method, the pressurized instillation method does not require water for salt dissolution and therefore the yield per batch according to the method is large. In addition, in the method, the reaction time can be shortened and therefore the system can be prevented from gelling, like in the normal-pressure instillation method. Accordingly, the method produces a polyamide compound having a low yellow index.

1-7-5. Step of Increasing Degree of Polymerization

The polyamide compound (A) produced according to the above-mentioned polycondensation method can be used directly as it is, however, the compound may be processed in a step of further increasing the degree of polymerization thereof. The step of increasing the degree of polymerization includes reactive extrusion in an extruder, solid-phase polymerization, etc. As the heating apparatus for use for solid-phase polymerization, preferred are a continuous heating and drying apparatus; a rotary drum-type heating apparatus such as a tumble drier, a conical drier, a rotary drier, etc.; and a conical heating apparatus equipped with a rotary blade inside it, such as a Nauta mixer, etc. Not limited to these, any ordinary method and apparatus are usable in the present invention. In particular, for solid-phase polymerization to give the polyamide compound (A), preferred is use of a rotary drum-type heating apparatus among the above, since the system can be airtightly sealed up and the polycondensation can be readily promoted therein in a condition where oxygen to cause discoloration is eliminated.

1-7-6. Phosphorus Atom-Containing Compound, Alkali Metal Compound

In polycondensation to produce the polyamide compound (A), preferred is adding a phosphorus atom-containing compound from the viewpoint of promoting the amidation reaction.

The phosphorus atom-containing compound includes phosphinic acid compounds such as dimethylphosphinic acid, phenylmethylphosphinic acid, etc.; hypophosphorous acid compounds such as hypophosphorous acid, sodium hypophosphite, potassium hypophosphite, lithium hypophosphite, magnesium hypophosphite, calcium hypophosphite, ethyl hypophosphite, etc.; phosphonic acid compounds such as phosphonic acid, sodium phosphonate, potassium phosphonate, lithium phosphonate, potassium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate, potassium ethylphosphonate, etc.; phosphonous acid compounds such as phosphonous acid, sodium phosphonite, lithium phosphonite, potassium phosphonite, magnesium phosphonite, calcium phosphonite, phenylphosphonous acid, sodium phenylphosphonite, lithium phenylphosphonite, ethyl phenylphosphonite, etc.; phosphorous acid compounds such as phosphorous acid, sodium hydrogenphosphite, sodium phosphite, lithium phosphite, potassium phosphite, magnesium phosphite, calcium phosphite, triethyl phosphite, triphenyl phosphite, pyrophosphorous acid, etc.

Of those, especially preferred for use herein are metal hypophosphites such as sodium hypophosphite, potassium hypophosphite, lithium hypophosphite, etc., as their effect of promoting amidation is high and their effect of preventing discoloration is excellent. In particular, sodium hypophosphite is preferred. However, the phosphorus atom-containing compounds usable in the present invention are not limited to the above.

The amount of the phosphorus atom-containing compound to be added is preferably from 0.1 to 1,000 ppm in terms of the phosphorus atom concentration in the polyamide compound (A), more preferably from 1 to 600 ppm, even more preferably from 5 to 400 ppm. When the amount is 0.1 ppm or more, the polyamide compound (A) is hardly discolored during polymerization and the transparency thereof could be high. When 1,000 ppm or less, the polyamide compound (A) hardly gels and, in addition, the shapes of the polyamide compound would have few fish eyes that may be caused by the phosphorus atom-containing compound, and therefore the appearance thereof could be good.

Also preferably, an alkali metal compound is added to the polycondensation system to give the polyamide compound (A), along with the phosphorus atom-containing compound thereto. A sufficient amount of a phosphorus atom-containing compound must be present in the system in order to prevent the discoloration of the polyamide (A) during polycondensation, which, however, may rather cause gelation of the polyamide compound as the case may be. Therefore, for avoiding the problem and additionally for controlling the amidation reaction speed, it is desirable to add an alkali metal compound to the system along with the phosphorus atom-containing compound thereto.

The alkali metal compound is preferably an alkali metal hydroxide, an alkali metal acetate, an alkali metal carbonate, an alkali metal alkoxide, etc. Specific examples of the alkali metal compound usable in the present invention include lithium hydroxide, sodium hydroxide, potassium hydroxide, rubidium hydroxide, cesium hydroxide, lithium acetate, sodium acetate, potassium acetate, rubidium acetate, cesium acetate, sodium methoxide, sodium ethoxide, sodium propoxide, sodium butoxide, potassium methoxide, lithium methoxide, sodium carbonate, etc., to which, however, the present invention is not limited. The ratio of the phosphorus atom-containing compound to the alkali metal compound, phosphorus atom-containing compound/alkali metal compound is preferably within a range of from 1.0/0.05 to 1.0/1.5, from the viewpoint of controlling the polymerization speed and reducing the yellow index, more preferably from 1.0/0.1 to 1.0/1.2, even more preferably from 1.0/0.2 to 1.0/1.1.

2. Transition Metal Compound (B)

The metal of the transition metal compound (B) for use in the present invention is preferably a metal of Group VIII of the Periodic Table such as iron, cobalt, nickel or the like, but in addition thereto, the metal includes Group I metals such as copper, silver, etc.; Group IV metals such as tin, titanium, zirconium, etc.; Group V metals such as vanadium, etc.; Group VI metals such as chromium, etc.; Group VII metals such as manganese, etc. Of those metals, preferred is cobalt from the viewpoint of the oxygen absorbability thereof.

Preferably, the transition metal compound (B) is an inorganic acid salt or an organic acid salt having a low valence number of the above-mentioned transition metal, or a complex salt of the above-mentioned transition metal.

The inorganic acid salt includes halides such as chlorides, etc.; sulfur oxyacid salts such as sulfates, etc.; nitrogen oxyacid salts such as nitrates, etc.; phosphorus oxyacid salts such as phosphates, etc.; silicates, etc.

The organic acid salt includes carboxylates, sulfonates, phosphonates, etc. Carboxylates are preferred for the object of the present invention, and their concrete examples include transition metal salts of acetic acid, propionic acid, isopropionic acid, butanoic acid, isobutanoic acid, pentanoic acid, isopentanoic acid, hexanoic acid, heptanoic acid, isoheptanoic acid, octanoic acid, 2-ethylhexanoic acid, nonanoic acid, 3,5,5-trimethylhexanoic acid, decanoic acid, neodecanoic acid, undecanoic acid, lauric acid, myristic acid, palmitic acid, margaric acid, stearic acid, arachic acid, linderic acid, tsuzuic acid, petroselinic acid, oleic acid, linolic acid, linolenic acid, arachidic acid, formic acid, oxalic acid, sulfamic acid, naphthenic acid, etc.

As the transition metal complexes, herein usable are complexes with β-diketones or β-ketoacid esters. As the β-diketones or β-ketoacid esters, for example, usable are acetylacetone, ethyl acetacetate, 1,3-cyclohexadione, methylenebis-1,3-cyclohexadione, 2-benzyl-1,3-cyclohexadione, acetyltetralone, palmitoyltetralone, stearoyltetralone, benzoyltetralone, 2-acetylcyclohexanone, 2-benzoylcyclohexanone, 2-acetyl-1,3-cyclohexanedione, benzoyl-p-chlorobenzoylmethane, bis(4-methylbenzoyl)methane, bis(2-hydroxybenzoyl)methane, benzoylacetone, tribenzoylmethane, diacetylbenzoylmethane, stearoylbenzoylmethane, palmitoylbenzoylmethane, lauroylbenzoylmethane, dibenzoylmethane, bis(4-chlorobenzoyl)methane, bis(methylene-3,4-dioxybenzoyl)methane, benzoylacetylphenylmethane, stearoyl(4-methoxybenzoyl)methane, butanoylacetone, distearoylacetone, acetylacetone, stearoylacetone, bis(cyclohexanoyl)methane, dipivaloylmethane, etc.

As the transition metal compound (B) for use in the present invention, preferred is cobalt(II) stearate or cobalt(II) acetate as solid or powdery and excellent in handleability in melt mixing thereof.

The preferred content of the transition metal compound (B) is, in terms of the metal atom concentration thereof, preferably from 10 to 800 ppm, more preferably from 50 to 600 ppm, even more preferably from 100 to 400 ppm, from the viewpoint of the oxygen absorbability and the transparency of the composition.

Conventional oxygen-trapping resin compositions containing a transition metal compound are often colored by transition metal catalysts. In addition, since the resin is oxidized through oxygen absorption, there are other problems in that decomposed product is generated and gives an offensive odor to the contents in containers or the resin is degraded through oxidation and the color and the strength of containers are thereby worsened. As opposed to this, in the polyamide composition of the present invention, the polyamide compound (A) itself has sufficient oxygen absorbability, and therefore the content of the transition metal compound (B) therein can be reduced to overcome the above-mentioned problems.

3. Oxidizing Organic Compound (C)

The polyamide composition of the present invention may further contain an oxidizing organic compound (C).

The oxidizing organic compound (C) in the present invention is an organic compound that oxidizes in an atmosphere where oxygen exists, automatically or in the presence of a catalyst or any one of heat, light, moisture or the like, and is preferably one having an active carbon atom that facilitates hydrogen abstraction. Specific examples of the active carbon atom include a carbon atom adjacent to a carbon-carbon double bond, a tertiary carbon atom with side chains bonding thereto, and an active methylene carbon.

For example, vitamin C and vitamin E are examples of the oxidizing organic compound (C). In addition, polymers having a readily-oxidizable tertiary hydrogen in the molecule, such as polypropylene, etc.; compounds having a carbon-carbon double bond in the molecule such as butadiene, isoprene, cyclohexanone; as well as polymers comprising or containing such compounds are also examples of the oxidizing organic compound (C). Above all, preferred are compounds and polymers having a carbon-carbon double bond from the viewpoint of the oxygen absorbability and the processability thereof; and more preferred are compounds containing a carbon-carbon double bond and having from 4 to 20 carbon atoms, and oligomers or polymers containing the unit derived from such compounds.

The compounds containing a carbon-carbon double bond and having from 4 to 20 carbon atoms include, for example, conjugated dienes such as butadiene, isoprene, etc.; linear non-conjugated dienes such as 1,4-hexadiene, 3-methyl-1,4-hexadiene, 4-methyl-1,4-hexadiene, 5-methyl-1,4-hexadiene, 4,5-dimethyl-1,4-hexadiene, 7-methyl-1,6-octadiene, etc.; cyclic non-conjugated dienes such as methyltetrahydroindene, 5-ethylidene-2-norbornene, 5-methylene-2-norbornene, 5-isopropylidene-2-norbornene, 5-vinylidene-2-norbornene, 6-chloromethyl-5-isopropenyl-2-norbornene, dicyclopentadiene, etc.; trienes such as 2,3-diisopropylidene-5-norbornene, 2-ethylidene-3-isopropylidene-5-norbornene, 2-propenyl-2,2-norbornadiene, etc.; chloroprene, etc.

One alone or a combination of two or more of these compounds, or a combination of these compounds with any other monomer may be formed into homopolymers, random copolymers, block copolymers or the like for use herein.

The monomer to be combined includes α-olefins having from 2 to 20 carbon atoms, such as ethylene, propylene, 1-butene, 4-methyl-1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-nonadecene, 1-eicosene, 9-methyl-1-decene, 11-methyl-1-dodecene, 12-ethyl-1-tetradecene, etc. In addition, also usable here are monomers such as styrene, vinyltoluene, acrylonitrile, methacrylonitrile, vinyl acetate, methyl methacrylate, ethyl acrylate, etc.

The oligomers or polymers containing the unit derived from the compounds containing a carbon-carbon double bond and having from 4 to 20 carbon atoms concretely include polybutadiene (BR), polyisoprene (IR), butyl rubber (IIR), natural rubber, nitrile-butadiene rubber (NBR), styrene-butadiene rubber (SBR), chloroprene rubber (CR), ethylene-propylene-diene rubber (EPDM), etc., to which, however, the invention is not limited. Not specifically defined, the carbon-carbon double bond in the polymers may exist in the form of a vinylene group in the main chain of the polymer, or may exist in the form of a vinyl group in the side chain thereof.

The oligomers or polymers containing the unit derived from the above-mentioned, carbon-carbon double bond-containing compounds are preferably such that a carboxylic acid group, a carboxylic acid anhydride group or a hydroxyl group is introduced in the molecule thereof, or the oligomer or the polymer is blended with an oligomer or polymer modified with such a functional group. The monomer to be used for introducing the functional group includes ethylenic unsaturated monomers having a functional group such as a carboxylic acid group, a carboxylic acid anhydride group, a carboxylic acid salt group, a carboxylate ester group, a carboxylic acid amide group, a carbonyl group, a hydroxyl group or the like.

As the monomers, preferably used are unsaturated carboxylic acids or their derivatives. Concretely, there are mentioned α,β-unsaturated carboxylic acids such as acrylic acid, methacrylic acid, maleic acid, fumaric acid, itaconic acid, citraconic acid, tetrahydrophthalic acid, etc.; unsaturated carboxylic acids such as bicycle[2,2,1]hept-2-ene-5,6-dicarboxylic acid, etc.; α,β-unsaturated carboxylic acid anhydrides such as maleic anhydride, itaconic anhydride, citraconic anhydride, tetrahydrophthalic anhydride, etc.; unsaturated carboxylic acid anhydrides such as bicycle[2,2,1]hept-2-ene-5,6-dicarboxylic acid anhydride, etc.

The acid-modified derivatives of oligomers or polymers that contain the unit derived from the carbon-carbon double bond-containing compound may be produced by graft-copolymerizing the oligomer or polymer with an unsaturated carboxylic acid or a derivative thereof in accordance with a per-se known method, or may also be produced by random-copolymerizing the above-mentioned carbon-carbon double bond-containing compound with an unsaturated carboxylic acid or a derivative thereof.

The preferred content of the oxidizing organic compound (C) is preferably from 0.01 to 10% by mass in the polyamide composition, from the viewpoint of the oxygen absorbability and the transparency of the composition, more preferably from 0.1 to 8% by mass, even more preferably from 0.5 to 5% by mass.

4. Polyamide Composition

The polyamide composition of the present invention can be produced by mixing the polyamide compound (A) and the transition metal compound (B) and optionally the oxidizing organic compound (C).

The polyamide compound (A) and the transition metal compound (B) can be mixed in any known conventional method. For example, there is mentioned a method where the polyamide compound (A) and the transition metal compound (B) are added to a mixing machine such as tumbler, mixer or the like and mixed therein. In the case where the transition metal compound (B) is a solid or powder, there may be employed a method where a viscous liquid is adhered to the polyamide compound (A) as a spreading agent and thereafter the transition metal compound (B) added to and mixed with the compound, for preventing them from separating after mixing. Also employable is a method comprising dissolving the transition metal compound (B) in an organic solvent, mixing the resulting solution and the polyamide compound (A) and thereafter or at the same time heating the mixture to remove the organic solvent, thereby adhering the transition metal compound to the polyamide. Further, in case where the components are melt-kneaded by the use of an extruder, the transition metal compound (B) may be introduced into the extruder via a feeder different from that for the polyamide compound (A).

In case where the oxidizing organic compound (B) is added, the compound may be added according to the same method as that mentioned above.

Depending on the desired use and performance, additives such as lubricant, crystallization nucleating agent, whitening inhibitor, delustering agent, heat-resistant stabilizer, weather-resistant stabilizer, UV absorbent, plasticizer, flame retardant, antistatic agent, discoloration inhibitor, antioxidant, impact resistance improver, etc., may be added to the polyamide composition of the present invention. These additives may be optionally added thereto within a range not detracting from the advantageous effects of the present invention. In addition, the polyamide composition of the present invention may be mixed with various resins in accordance with the desired use and performance thereof. In the polyamide composition, the polyamide compound (A) (polyamide resin and polyamide oligomer) may react with the additives and the resins added thereto.

4-1. Whitening Inhibitor

In the polyamide composition of the present invention, preferably, a diamide compound and/or a diester compound are added to the polyamide compound for preventing the composition from whitening after hot water treatment or after long-term aging. The diamide compound and/or the diester compound are effective for preventing whitening due to oligomer precipitation. The diamide compound and the diester compound may be used alone, or may be used as combined.

The diamide compound is preferably a diamide compound obtained from an aliphatic dicarboxylic acid having from 8 to 30 carbon atoms and a diamine having from 2 to 10 carbon atoms. An aliphatic dicarboxylic acid having 8 or more carbon atoms and a diamine having at least two carbon atoms are expected to realize the whitening-preventing effect. On the other hand, an aliphatic dicarboxylic acid having 30 or less carbon atoms and a diamine having 10 or less carbon atoms may give a diamide compound well and uniformly dispersible in the polyamide composition. The aliphatic dicarboxylic acid may have a side chain or a double bond, but a linear saturated aliphatic dicarboxylic acid is preferred for use herein. One alone or two or more different types of such diamide compounds may be used here either singly or as combined.

The aliphatic dicarboxylic acid includes stearic acid (C18), eicosanoic acid (C20), behenic acid (C22), montanic acid (C28), triacontanoic acid (C30), etc. The diamine includes ethylenediamine, butylenediamine, hexanediamine, xylylenediamine, bis(aminomethyl)cyclohexane, etc. Diamide compounds to be obtained by combining these are preferred here.

Preferred is a diamide compound to be obtained from an aliphatic dicarboxylic acid having from 8 to 30 carbon atoms and a diamine mainly comprising ethylenediamine, or a diamide compound to be obtained from an aliphatic dicarboxylic acid mainly comprising montanic acid and a diamine having from 2 to 10 carbon atoms; and more preferred is a diamide compound to be obtained from an aliphatic dicarboxylic acid mainly comprising stearic acid and a diamine mainly comprising ethylenediamine.

As the diester compound, preferred is a diester compound to be obtained from an aliphatic dicarboxylic acid having from 8 to 30 carbon atoms and a diol having from 2 to 10 carbon atoms. An aliphatic dicarboxylic acid having 8 or more carbon atoms and a diamine having 2 or more carbon atoms are expected to exhibit the whitening preventing effect. On the other hand, an aliphatic dicarboxylic acid having 30 or less carbon atoms and a diol having 10 or less carbon atoms realize good and uniform dispersion in the resin composition. The aliphatic dicarboxylic acid may have a side chain or a double bond, but preferred here is a linear saturated aliphatic dicarboxylic acid. One alone or two or more different types of such diester compounds may be used here either singly or as combined.

The aliphatic dicarboxylic acid includes stearic acid (C18), eicosanoic acid (C20), behenic acid (C22), montanic acid (C28), triacontanoic acid (C30), etc. The diol component of the diester compound for use in the present invention includes ethylene glycol, propanediol, butanediol, hexanediol, xylylene glycol, cyclohexanedimethanol, etc. Diester compounds to be obtained by combining these are preferred here.

Especially preferred is a diester compound to be obtained from an aliphatic dicarboxylic acid comprising mainly montanic acid and a diol comprising mainly ethylene glycol and/or 1,3-butanediol.

In the present invention, the amount to be added of the diamide compound and/or the diester compound may be from 0.005 to 0.5 parts by mass relative to 100 parts by mass of the polyamide compound (A), preferably from 0.05 to 0.5 parts by mass, more preferably from 0.12 to 0.5 parts by mass. When the compound is added in an amount of 0.005 parts by mass or more relative to 100 parts by mass of the polyamide compound (A) and when the compound is combined with a crystallization nucleating agent, then the synergistic effect for whitening prevention is expected. When the amount of the compound is 0.5 parts by mass or less relative to 100 parts by mass of the polyamide compound (A), then the haze value of the shapes to be obtained by forming the polyamide composition of the present invention can be kept low.

4-2. Crystallization Nucleating Agent

Preferably, a crystallization nucleating agent is added to the polyamide composition of the present invention from the viewpoint of improving the transparency of the composition. The agent is effective not only for improving the transparency but also for whitening prevention through crystallization after hot water treatment or after long-term aging; and by adding the crystallization nucleating agent to the polyamide composition, the crystal size can be reduced to ½ or less of the wavelength of visible light. When the diamide compound and/or the diester compound is used here along with the crystallization nucleating agent, their synergistic effect realizes much more excellent whitening prevention than the degree thereof expected from the whitening preventing effect of the individual ingredients.

Inorganic crystallization nucleating agents usable in the present invention are those generally used for thermoplastic resins, including glass fillers (glass fibers, milled glass fibers, glass flakes, glass beads, etc.), calcium silicate fillers (wollastonite, etc.), mica, talc (powdery talc, or granular talc with rosin as a binder, etc.), kaolin, potassium titanate whiskers, boron nitride, clay such as phyllosilicate, nanofillers, carbon fibers, etc. Two or more of these may be used here as combined. Preferably, the maximum diameter of the inorganic crystallization nucleating agent is from 0.01 to 5 µm. In particular, powdery talc having a particle size of 3.0 µm or less is preferred, powdery talc having a particle size of from 1.5 to 3.0 µm or so is more preferred, and powdery talc having a particle size of 2.0 µm or less is even more preferred. Granular talc prepared by adding rosin as a binder to the powdery talc is especially preferred since the dispersion state thereof in the polyamide composition is good. Organic crystallization nucleating agents preferred for use herein are micro-level to nano-level size bimolecular membrane capsules containing a crystallization nucleating agent, as well as bis(benzylidene)sorbitol-type or phosphorus-containing transparent crystallization nucleating agents, rosinamide-type gelling agents, etc. Especially preferred are bis(benzylidene)sorbitol-type crystallization nucleating agents.

The amount of the crystallization nucleating agent to be added is preferably from 0.005 to 2.0 parts by mass relative to 100 parts by mass of the polyamide compound (A), more preferably from 0.01 to 1.5 parts by mass. At least one such crystallization nucleating agent is added to the polyamide compound along with the diamide compound and/or the diester compound added thereto, thereby attaining the synergistic whitening preventing effect. Especially preferably, the inorganic crystallization nucleating agent such as talc or the like is added in an amount of from 0.05 to 1.5 parts by mass relative to 100 parts by mass of the polyamide compound (A), and the organic crystallization nucleating agent such as bis(benzylidene)sorbitol-type crystallization nucleating agent or the like is added in an amount of from 0.01 to 0.5 parts by mass relative to 100 parts by mass of the polyamide compound (A).

The bis(benzylidene)sorbitol-type crystallization nucleating agent is selected from bis(benzylidene)sorbitol and bis(alkylbenzylidene)sorbitol, and is a condensation product (diacetal compound) to be produced through acetalization of sorbitol and benzaldehyde or alkyl-substituted benzaldehyde; and this can be conveniently produced according to various methods known in the art. In this, the alkyl may be linear or cyclic, and may be saturated or unsaturated. An ordinary production method comprises reaction of 1 mol of D-sorbitol and about 2 mols of aldehyde in the presence of an acid catalyst. The reaction temperature may vary in a broad range depending on the properties (melting point, etc.) of the aldehyde to be used as the starting material for the reaction. The reaction medium may be an aqueous medium or a nonaqueous medium. One preferred method for preparing the diacetal is described in U.S. Pat. No. 3,721,682. The disclosed contents are limited to benzylidene sorbitols; however, the bis(alkylbenzylidene)sorbitol for use in the present invention can be conveniently produced according to the method disclosed in the reference.

Specific examples of the bis(benzylidene)sorbitol-type crystallization nucleating agent (diacetal compounds) include bis(p-methylbenzylidene)sorbitol, bis(p-ethylbenzylidene)sorbitol, bis(n-propylbenzylidene)sorbitol, bis(p-isopropylbenzylidene)sorbitol, bis(p-isobutylbenzylidene)sorbitol, bis(2,4-dimethylbenzylidene)sorbitol, bis(3,4-dimethylbenzylidene)sorbitol, bis(2,4,5- trimethylbenzylidene)sorbitol, bis(2,4,6-trimethylbenzylidene)sorbitol, bis(4-biphenylbenzylidene)sorbitol, etc.

Examples of the alkyl-substituted benzaldehyde suitable for preparing the bis(benzylidene)sorbitol-type crystallization nucleating agent include p-methylbenzaldehyde, n-propylbenzaldehyde, p-isopropylbenzaldehyde, 2,4-dimethylbenzladehyde, 3,4-dimethylbenzaldehyde, 2,4,5-trimethylbenzaldehyde, 2,4,6-trimethylbenzaldehyde, 4-biphenylbenzaldehyde.

When the crystallization nucleating agent such as talc, mica, clay or the like is added to the polyamide composition, then the crystallization speed of the composition is accelerated by at least two times that of the polyamide composition to which the agent is not added. This would cause no problem in injection molding use that requires a large number of molding cycles; however, for deep-drawn cups to be formed from a stretched film or sheet, when the crystallization speed is too high, the film or sheet could not be stretched owing to crystallization, or may be broken or may have other problems of stretching unevenness, or that is, in these cases, the formability greatly worsens. However, the bis(benzylidene)sorbitol-type crystallization nucleating agent does not accelerate the crystallization speed of the polyamide composition even when added to the composition, and therefore, the agent is preferably used for deep-drawn caps to be formed from stretched film or sheet.

Further, it has been found that the bis(benzylidene)sorbitol-type crystallization nucleating agent is effective not only for whitening prevention but also for improving the oxygen barrier property of polyamide compounds when added thereto. Use of the bis(benzylidene)sorbitol-type crystallization nucleating agent that realizes both effects of whitening prevention and oxygen barrier property improvement is especially preferred here.

The polyamide composition of the present invention, to which is added a phyllosilicate, can be used as a barrier layer, and the composition can enhance not only the oxygen barrier property of shapes but also the other barrier property to other gases such as carbon dioxide, etc.

The phyllosilicate is a 2-octahedral or 3-octahedral phyllosilicate having a charge density of from 0.25 to 0.6. The 2-octahedral phyllosilicate includes montmorillonite, beidellite, etc.; and the 3-octahedral phyllosilicate includes hectorite, saponite, etc. Of those, preferred is montmorillonite.

The phyllosilicate is preferably one in which the layer-to-layer distance is broadened by previously bringing the phyllosilicate into contact with an organic swelling agent such as a polymer compound, an organic compound or the like. As the organic swelling agent, preferred for use herein is a quaternary ammonium salt, and more preferred is a quaternary ammonium salt having at least one alkyl or alkenyl group with 12 or more carbon atoms.

Specific examples of the organic swelling agent include trimethylalkylammonium salts such as trimethyldodecylammonium salts, trimethyltetradecylammonium salts, trimethylhexadecylammonium salts, trimethyloctadecylammonium salts, trimethyleicosylammonium salts, etc.; trimethylalkenylammonium salts such as trimethyloctadecenylammonium salts, trimethyloctadecadienylammonium salts, etc.; triethylalkylammonium salts such as triethyldodecylammonium salts, triethyltetradecylammonium salts, triethylhexadecylammonium salts, trimethyloctadecylammonium salts, etc.; tributylalkylammonium salts such as tributyldodecylammonium salts, tributyltetradecylammonium salts, tributylhexadecylammonium salts, tributyloctadecylammonium salts, etc.; dimethyldialkylammonium salts such as dimethyldidodecylammonium salts, dimethylditetradecylammonium salts, dimethyldihexadecylammonium salts, dimethyldioctadecylammonium salts, dimethylditallowammonium salts, etc.; dimethyldialkenylammonium salts such as dimethyldioctadecenylammonium salts, dimethyldioctadecadienylammonium salts, etc.; diethyldialkylammonium salts such as diethyldidodecylammonium salts, diethylditetradecylammonium salts, diethyldihexadecylammonium salts, diethyldioctadecylammonium salts, etc.; dibutyldialkylammonium salts such as dibutyldidodecylammonium salts, dibutylditetradecylammonium salts, dibutyldihexadecylammonium salts, dibutyldioctadecylammonium salts, etc.; methylbenzyldialkylammonium salts such as methylbenzyldihexadecylammonium salts, etc.; dibenzyldialkylammonium salts such as dibenzyldihexadecylammonium salts, etc.; trialkylmethylammonium salts such as tridecylmethylammonium salts, tritetradecylmethylammonium salts, trioctadecylmethylammonium salts, etc.; trialkylethylammonium salts such as tridodecylethylammonium salts, etc.; trialkylbutylammonium salts such as tridodecylbutylammonium salts, etc.; ω-amino acids such as 4-amino-n-butyric acid, 6-amino-n-caproic acid, 8-aminocaprylic acid, 10-aminodecanoic acid, 12-aminododecanoic acid, 14-aminotetradecanoic acid, 16-aminohexadecanoic acid, 18-aminooctadecanoic acid, etc. In addition, also usable here as an organic swelling agent are ammonium salts containing a hydroxyl group and/or an ether group, above all, quaternary ammonium salts containing at least one alkylene glycol residue are also usable here, such as methyldialkyl (PAG)ammonium salts, ethyldialkyl(PAG)ammonium salts, butyldialkyl(PAG)ammonium salts, dimethylbis(PAG)ammonium salts, diethylbis(PAG)ammonium salts, dibutylbis (PAG)ammonium salts, methylalkylbis(PAG)ammonium salts, ethylalkylbis(PAG)ammonium salts, butylalkylbis(PAG)ammonium salts, methyltri(PAG)ammonium salts, ethyltri (PAG)ammonium salts, butyltri(PAG)ammonium salts, tetra (PAG)ammonium salts (in which alkyl means an alkyl group having 12 or more carbon atoms such as dodecyl, tetradecyl, hexadecyl, octadecyl, eicosyl, etc.; and PAG means a polyalkylenes glycol residue, preferably a polyethylene glycol residue or a polypropylene glycol residue having 20 or less carbon atoms). Above all, preferred are trimethyldodecylammonium salts, trimethyltetradecylammonium salts, trimethylhexadecylammonium salts, trimethyloctadecylammonium salts, dimethyldidodecylammonium salts, dimethylditetradecylammonium salts, dimethyldihexadecylammonium salts, dimethyldioctadecylammonium salts, dimethylditallowammonium salts. One alone or two or more different types of these organic swelling agents may be used here either singly or as combined.

In the present invention, preferably, the phyllosilicate salt treated with an organic swelling agent is added in an amount of from 0.5 to 8 parts by mass relative to 100 parts by mass of the polyamide compound (A), more preferably from 1 to 6 parts by mass, even more preferably from 2 to 5 parts by mass. When the amount of the phyllosilicate salt added is less than 0.5 parts by mass, then it is unfavorable since the effect thereof to improve the gas barrier property of the polyamide composition is poor. On the other hand, when more than 8 parts by mass, it is also unfavorable since the gas barrier layer would get cloudy therefore detracting from the transparency of containers.

In the polyamide composition, preferably, the phyllosilicate salt is uniformly dispersed, not locally aggregated therein. Uniform dispersion as referred to herein means that the phyllosilicate salt particles are tabularly separated from each other, and 50% or more thereof are spaced from each other via an interlayer distance of 5 nm or more. The interlayer distance as referred to herein means the distance between the centroids of the tabular particles. A larger interlayer distance means a better dispersion condition; and the dispersion having a larger interlayer distance could provide a better appearance such as better transparency of shapes, and could enhance more the gas barrier property for oxygen, carbon dioxide and others of shapes.

4-3. Gelation Preventing/Fish Eyes Reducing Agent

Preferably, at least one carboxylate salt selected from sodium acetate, potassium acetate, magnesium acetate, calcium stearate, magnesium stearate, sodium stearate and their derivatives is added to the polyamide composition of the present invention. The derivatives include metal 12-hydroxystearates such as calcium 12-hydroxystearate, magnesium 12-hydroxystearate, sodium 12-hydroxystearate, etc. Adding the carboxylate salt prevents gelation of the polyamide composition during working and forming the composition and reduces fish eyes in the resulting shapes, therefore enhancing the formability of the composition.

The amount of the carboxylate salt to be added is preferably from 400 to 10,000 ppm as the concentration thereof in the polyamide composition, more preferably from 800 to 5,000 ppm, even more preferably from 1,000 to 3,000 ppm. When the amount is 400 ppm or more, then the polyamide composition can be prevented from being thermally deteriorated and can be prevented from gelling. On the other hand, when 10,000 ppm or less, then the polyamide composition does not fail to be shaped and does not discolor or whiten. When a carboxylate salt of a basic substance exists in a molten polyamide composition, then the thermal degradation of the polyamide composition could be retarded and the formation of a gel that is considered to be a final degraded product could be prevented.

The above-mentioned carboxylate salts are excellent in handleability, and among these, metal stearates are inexpensive and have an additional effect as a lubricant, and are therefore preferred for use herein as capable of more stabilizing the operation of working and forming the polyamide composition. The morphology of the carboxylate salt is not specifically defined. Preferably, the salt is powdery and has a small particle size as it is easy to uniformly disperse the salt in the polyamide composition in dry mixing. Concretely, the particle size is preferably 0.2 mm or less.

4-4. Antioxidant

Preferably, an antioxidant is added to the polyamide composition of the present invention from the viewpoint of controlling the oxygen absorption performance of the composition and inhibiting the physical properties of the composition from worsening. Examples of the antioxidant include a copper-based antioxidant, a hindered phenol-type antioxidant, a hindered amine-type antioxidant, a phosphorus-containing antioxidant, a thio-type antioxidant, etc. Above all, preferred are a hindered phenol-type antioxidant and a phosphorus-containing antioxidant.

Specific examples of the hindered phenol-type antioxidant include triethylene glycol bis[3-(3-t-butyl-5-methyl-4-hydroxyphenyl)propionate, 4,4'-butylidene-bis(3-methyl-6-t-butylphenol), 1,6-hexanediol bis[3-(3,5-di-t-butyl-4-hydroxyphenyl)propionate, 2,4-bis-(n-octylthio-6-(4-hydroxy-3,5-di-t-butylanilino)-1,3,5-triazine, pentaerythrityl tetrakis[3-(3,5-di-t-butyl-4-hydroxyphenyl)propionate], 2,2'-thiodiethylene bis[3-(3,5-di-t-butyl-4-hydroxyphenyl) propionate], octadecyl 3-(3,5-di-t-butyl-4-hydroxyphenyl) propionate, 2,2-thiobis(4-methyl-6-1-butylphenol), N,N'-hexamethylenebis(3,5-di-t-butyl-4-hydroxy-hydroxycinnamide), 3,5-di-t-butyl-4-hydroxy-benzylphosphonate diethyl ester, 1,3,5-trimethyl-2,4,6-tris(3,5-di-butyl-4-hydroxybenzyl)benzene, ethyl calcium bis(3,5-di-t-butyl-4-hydroxybenzyl)sulfonate, tris-(3,5-di-t-butyl-4-hydroxybenzyl)isocyanurate, 2,6-di-t-butyl-p-cresol, butylated hydroxyanisole, 2,6-di-t-butyl-4-ethylphenol, stearyl β-(3,5-di-t-butyl-4-hydroxyphenyl)propionate, 2,2'-methylenebis-(4-methyl-6-t-butylphenol), 2,2'-methylenebis (4-ethyl-6-t-butylphenol), 4,4'-thiobis-(3-methyl-6-t-butylphenol), octylated diphenylamine, 2,4-bis[(octylthio) methyl]-O-cresol, isooctyl 3-(3,5-di-t-butyl-4-hydroxyphenyl)propionate, 4,4'-butylidenebis(3-methyl-6-t-butylphenol), 3,9-bis[1,1-dimethyl-2-[β-(3-t-butyl-4-hydorxy-5-methylphenyl)propionyloxy]ethyl]-2,4,8,10-tetroxaspiro[5,5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, bis[3,3'-bis(4'-hydroxy-3'-t-butylphenyl)butyric acid]glycol ester, 1,3,5-tris(3',5'-di-t-butyl-4'-hydroxybenzyl)sec-triazine-2,4,6-(1H,3H,5H) trione, d-α-tocopherol, etc. These may be used here either alone or as combined. Specific examples of commercial products of hindered phenol compounds include BASF's Irganox 1010 and Irganox 1098 (both trade names).

Specific examples of the phosphorus-containing antioxidant include organic phosphorus compounds such as triphenyl phosphite, trioctadecyl phosphite, tridecyl phosphite, trinonylphenyl phosphite, diphenylisodecyl phosphite, bis(2,6-di-tert-butyl-4-methylphenyl)pentaerythritol diphosphite, bis(2,4-di-tert-butylphenyl)pentaerythritol diphosphite, tris (2,4-di-tert-butylphenyl)phosphite, distearylpentaerythritol diphosphite, tetra(tridecyl-4,4'-isopropylidenediphenyl) diphosphite, 2,2-methylenebis(4,6-di-tert-butylphenyl)octyl phosphite, etc. These may be used here either alone or as combined.

The content of the antioxidant in the polyamide composition is not limited, falling within a range not detracting from the properties of the composition. However, from the viewpoint of controlling the oxygen absorption performance of the composition and inhibiting the physical properties of the composition from worsening, the content is preferably from 0.001 to 3 parts by mass relative to 100 parts by mass of the polyamide compound (A), more preferably from 0.01 to 1 part by mass.

4-5. Impact Resistance Improver

An impact resistance improver may be added to the polyamide composition of the present invention for improving the impact resistance of the composition and the pinhole resistance and the flexibility of the films of the composition. The impact resistance improver includes polyolefin, polyamide elastomer, hydrogenated styrene-butadiene copolymer resin, ionomer, ethylene-ethyl acrylate copolymer resin, maleic anhydride-modified ethylene-ethyl acrylate copolymer resin, ethylene-methacrylic acid copolymer resin, nylon 6, 66, 12, nylon 12, nylon 12 elastomer, ethylene-propylene copolymer elastomer, polyester elastomer, etc. The amount of the impact resistance improver to be added is preferably from 1 to 10% by mass, more preferably from 1 to 5% by mass, even more preferably from 2 to 3% by mass. When the added amount is too large, then the transparency and the gas barrier property of the composition may lower. When the added amount is too small, then the impact resistance, the pinhole resistance and the flexibility of the films of the composition could not be enhanced so much.

5. Use of Polyamide Composition

The polyamide composition of the present invention is usable for various applications that require oxygen barrier property and oxygen absorption performance. For example, the polyamide composition of the present invention can be filled in small pouches by itself therein and can be used as an oxygen absorbent.

Typical application examples of the polyamide composition of the present invention include shapes of packaging materials, packaging containers, etc., to which, however, the present invention is not limited. The polyamide composition of the present invention may be worked to give a shape that comprising it as at least a part of the shape for use in the present invention. For example, the polyamide composition of the present invention may be used as at least a part of a filmy or sheet-like packaging material. In addition, it may be used as at least a part of packaging containers such as bottles, trays, cups, tubes, as well as various types of pouches such as flat pouches, standing pouches, etc. Not specifically defined, the thickness of the layer of the polyamide composition of the present invention is preferably 1 µm or more.

The method for producing the shapes of packaging materials and packaging containers is not specifically defined, for which any method is employable. For example, for forming a filmy or sheet-like packaging material, or a tubular packaging material, the polyamide composition that has been melted through a T-die, a circular die or the like may be extruded out through the accompanying extruder. The filmy shape obtained according to the above-mentioned method may be stretched to give a stretched film. The bottle-shaped packaging containers may be produced by injecting a molten polyamide composition into a mold from an injection-molding machine to prepare a preform, followed by blow-stretching it by heating up to the stretching temperature thereof.

Containers such as trays, cups and the like can be produced according to a method of injecting a molten polyamide composition into a mold from an injection-molding machine followed by molding it therein, or according to a method of forming a sheet-like packaging material into shapes in a mode of vacuum forming, pressure forming or the like. The packaging materials and the packaging containers can be produced according to various methods, not limited to the above-mentioned production methods.

The packaging materials and the packaging containers obtained by the use of the polyamide composition of the present invention are suitable for housing and storing various goods therein. For example, they can be used for housing and storing various goods such as drinks, seasonings, cereals, liquid and solid processed foods that are needed to be filled in a germ-free condition or to be thermally sterilized, chemicals, liquid livingware, drugs, semiconductor integrated circuits, electronic devices, etc.

EXAMPLES

The present invention is described in more detail with reference to the following Examples; however, the present invention is not limited to these Examples.

In the following Examples,
polymetaxylylenadipamide is referred to as "N-MXD6",
polymetaxylylenesebacamide is as "N-MXD10",
isophthalic acid-copolymerized polymetaxylylenadipamide is as "N-MXD6I",
ε-caprolactam-copolymerized polymetaxylylenadipamide is as "N-MXD6,6",
poly(cyclohexane-1,3-dimethylene)adipamide is to as "N-1,3BAC6", and
polyhexamethylenadipamide is as "N66".

The polyamide compounds obtained in Production Examples were analyzed for the constitutional composition, the relative viscosity, the terminal amino group concentration, the glass transition temperature and the melting point thereof, according to the methods mentioned below. In addition, the amount of oxygen absorbed by the films obtained in Examples and Comparative Examples was measured according to the method mentioned below.

(1) Constitutional Composition

Using a $^1$H-NMR apparatus (400 MHz; JEOL's trade name, JNM-AL400; measurement mode, NON ($^1$H)), the copolymer was quantitatively analyzed for the constitutional composition thereof. Concretely, using formic acid-d as a solvent, a solution of 5% by mass of the polyamide compound was prepared and analyzed through $^1$H-NMR.

(2) Relative Viscosity 0.2 g of sample pellets were accurately weighed, and dissolved with stirring in 100 ml of 96% sulfuric acid at 20 to 30° C. After completely dissolved, 5 ml of the solution was rapidly taken in a Canon Fenske-type viscometer. This was left in a thermostat bath at 25° C. for 10 minutes, and then the dropping time (t) thereof was measured. The dropping time ($t_0$) of 96% sulfuric acid was also measured in the same manner, and the relative viscosity of the sample was calculated according to the following equation from t and $t_0$.

$$\text{Relative Viscosity} = t/t_0$$

(3) Terminal Amino Group Concentration [$NH_2$]

The polyamide compound was weighed accurately, dissolved in a solution of phenol/ethanol=4/1 by volume with stirring at 20 to 30° C. After this was completely dissolved, the inner wall of the chamber was washed with 5 ml of methanol with stirring, and this was titered for neutralization with an aqueous solution of 0.01 mol/L hydrochloric acid thereby determining the terminal amino group concentration [$NH_2$] of the compound.

(4) Glass Transition Temperature and Melting Point

Using a differential scanning calorimeter (DSC-60, a trade name, produced by Shimadzu Corporation), the sample was analyzed through DSC (differential scanning calorimetry) in a nitrogen current atmosphere at a heating rate of 10° C./min, thereby determining the glass transition temperature (Tg) and the melting point (Tm) thereof.

(5) Oxygen Absorption

Two test pieces of 10 cm×10 cm, as cut out of the produced, unstretched single-layer film, or 1 g of a ground sample of the film, as wrapped in medical paper, was put into a three-side sealed bag of an aluminium foil laminate film having a size of 25 cm×18 cm, along with cotton infiltrated with 10 ml of water therein, and sealed up so that the in-bag air amount could be 400 ml. The humidity inside the bag was made to be 100% RH (relative humidity). After thus stored at 40° C. for 7 days, 14 days and 28 days, the oxygen concentration inside the bag was measured with an oxygen concentration gauge (Toray Engineering's trade name, LC-700F). From the oxygen concentration, the oxygen absorption of the sample was calculated. The sample having a higher value of oxygen absorption is more excellent in oxygen absorption performance and is better.

Production Example 1

Production of Polyamide Compound 1

13000 g (88.96 mol) of accurately-weighed adipic acid (by Asahi Kasei Chemicals), 880.56 g (9.88 mol) of DL-alanine (by Musashimo Chemical Laboratory), 11.7 g (0.11 mol) of sodium hypophosphite and 6.06 g (0.074 mol) of sodium acetate were put into a pressure reactor having an internal volume of 50 L and equipped with a stirrer, a partial condenser, a complete condenser, a pressure regulator, a thermometer, a dropping funnel, a pump, an aspirator, a nitrogen-introducing duct, a bottom drain valve and a strand die, fully purged with nitrogen, closed, and then heated up to 170° C. with stirring while kept under 0.4 MPa. After the reactor reached 170° C., 12082.2 g (88.71 mol) of m-xylylenediamine (by Mitsubishi Gas Chemical) kept in the dropping funnel was dropwise added to the molten material in the reactor with stirring, and while the formed condensation water was removed out of the system kept under 0.4 MPa, the reactor was continuously heated up to 240° C. After the addition of m-xylylenediamine, the inner pressure of the reactor was gradually restored to normal pressure, and then, via the aspirator, the reactor was depressurized to a reduced pressure of 80 kPa and the condensation water was removed. During depressurization, the stirring torque of the stirrer was monitored, and after it reached a predetermined level, the stirring was stopped. The reactor was pressurized with nitrogen, then the bottom drain valve was opened and the polymer was taken out through the strand die, then stranded, cooled and pelletized with a pelletizer to give DL-alanine-copolymerized N-MXD6 (polyamide compound 1).

Production Example 2

Production of Polyamide Compound 2

DL-alanine-copolymerized N-MXD6 (polyamide compound 2) was produced in the same manner as in Production Example 1 except that the amount of DL-alanine to be added was so changed that the DL-alanine content could be 11.1% by mol and the blend ratio of the starting materials was changed as in Table 1.

Production Example 3

Production of Polyamide Compound 3

DL-alanine-copolymerized N-MXD6 (polyamide compound 3) was produced in the same manner as in Production Example 1 except that the amount of DL-alanine to be added was so changed that the DL-alanine content could be 17.6% by mol and the blend ratio of the starting materials was changed as in Table 1.

Production Example 4

Production of Polyamide Compound 4

DL-alanine-copolymerized N-MXD6 (polyamide compound 4) was produced in the same manner as in Production Example 1 except that the amount of DL-alanine to be added was so changed that the DL-alanine content could be 25.0% by mol and the blend ratio of the starting materials was changed as in Table 1.

Production Example 5

Production of Polyamide Compound 5

DL-alanine-copolymerized N-MXD6 (polyamide compound 5) was produced in the same manner as in Production Example 1 except that the amount of DL-alanine to be added was so changed that the DL-alanine content could be 33.3% by mol and the blend ratio of the starting materials was changed as in Table 1.

Production Example 6

Production of Polyamide Compound 6

DL-leucine-copolymerized N-MXD6 (polyamide compound 6) was produced in the same manner as in Production Example 1 except that the α-amino acid was changed to DL-leucine (by Ningbo Haishuo Bio-technology), the amount of DL-leucine to be added was such that the DL-leucine content could be 11.1% by mol, and the blend ratio of the starting materials was changed as in Table 1.

Production Example 7

Production of Polyamide Compound 7

DL-valine-copolymerized N-MXD6 (polyamide compound 7) was produced in the same manner as in Production Example 1 except that the α-amino acid was changed to DL-valine (by Sinogel Amino Acid Co., Ltd.), the amount of DL-valine to be added was such that the DL-valine content could be 11.1% by mol, and the blend ratio of the starting materials was changed as in Table 1.

Production Example 8

Production of Polyamide Compound 8

DL-alanine-copolymerized N-MXD10 (polyamide compound 8) was produced in the same manner as in Production Example 1 except that adipic acid was changed to sebacic acid (by Itoh Oil), the amount of DL-alanine to be added was so changed that the DL-alanine content could be 11.1% by mol, and the blend ratio of the starting materials was changed as in Table 1.

Production Example 9

Production of Polyamide Compound 9

DL-alanine-copolymerized N-MXD6I (polyamide compound 9) was produced in the same manner as in Production Example 1 except that adipic acid was changed to a mixture of isophthalic acid (by AG International Chemical)/adipic acid=1/7 (by mol), the amount of DL-alanine to be added was so changed that the DL-alanine content could be 11.1% by mol, and the blend ratio of the starting materials was changed as in Table 1.

Production Example 10

Production of Polyamide Compound 10

DL-alanine-copolymerized N-MXD6,6 (polyamide compound 10) was produced in the same manner as in Production Example 1 except that adipic acid was changed to a mixture of ε-caprolactam (by Ube Kosan)/adipic acid=1/7 (by mol), the amino acid was changed to DL-leucine (by Ningbo Haishuo Bio-technology), the amount of DL-leucine to be added was such that the DL-leucine content could be 11.1% by mol, and the blend ratio of the starting materials was changed as in Table 1.

Production Example 11

Production of Polyamide Compound 11

DL-alanine-copolymerized N-MXD6 (polyamide compound 11) was produced in the same manner as in Production Example 2 except that the blend ratio of the starting materials was so changed that the terminal amino group of the polyamide compound could be around 20 µeq/g, as in Table 1.

Production Example 12

Production of Polyamide Compound 12

DL-alanine-copolymerized N-MXD6 (polyamide compound 12) was produced in the same manner as in Production Example 2 except that the blend ratio of the starting materials was so changed that the terminal amino group of the polyamide compound could be around 90 µeq/g, as in Table 1.

Production Example 13

Production of Polyamide Compound 13

N-MXD6 (polyamide compound 13) was produced in the same manner as in Production Example 1 except that DL-alanine was not added and the blend ratio of the starting materials was changed as in Table 1.

Production Example 14

Production of Polyamide Compound 14

N-MXD6 (polyamide compound 14) was produced in the same manner as in Production Example 13 except that the blend ratio of the starting materials was so changed that the terminal amino group of the polyamide compound could be around 20 µeq/g, as in Table 1.

Production Example 15

Production of Polyamide Compound 15

N-MXD6 (polyamide compound 15) was produced in the same manner as in Production Example 13 except that the blend ratio of the starting materials was so changed that the terminal amino group of the polyamide compound could be around 90 µeq/g, as in Table 1.

Production of Polyamide Compound 16

DL-alanine-copolymerized N-MXD6/DL-alanine-copolymerized N-1,3BAC6 copolymer (polyamide compound 16) was produced in the same manner as in Production Example 1 except that m-xylylenediamine was changed to a mixture of 1,3-bisaminomethylcyclohexane (by Mitsubishi Gas)/m-xylylenediamine=1/3, the amount of DL-alanine to be added was so changed that the DL-alanine content could be 11.0% by mol, and the blend ratio of the starting materials was changed as in Table 1.

Production of Polyamide Compound 17

DL-alanine-copolymerized N-MXD6/DL-alanine-copolymerized N66 copolymer (polyamide compound 17) was produced in the same manner as in Production Example 1 except that m-xylylenediamine was changed to a mixture of hexamethylenediamine (by Asahi Kasei Chemicals)/m-xylylenediamine=1/3, the amount of DL-alanine to be added was so changed that the DL-alanine content could be 11.0% by mol, and the blend ratio of the starting materials was changed as in Table 1.

Production Example 18

Production of Polyamide Compound 18

DL-alanine-copolymerized N-MXD6 (polyamide compound 18) was produced in the same manner as in Production Example 1 except that the amount of DL-alanine to be added was so changed that the DL-alanine content could be 11.1% by mol, the blend ratio of the starting materials was changed as in Table 1, and the reaction termination time was so changed that the polyamide compound produced could have a relative viscosity of 1.5.

Production Example 19

Production of Polyamide Compound 19

DL-alanine-copolymerized N-MXD6 (polyamide compound 19) was produced in the same manner as in Production Example 1 except that the amount of DL-alanine to be added was so changed that the DL-alanine content could be 17.6% by mol, the blend ratio of the starting materials was changed as in Table 1, and the reaction termination time was so changed that the polyamide compound produced could have a relative viscosity of 1.6.

Table 1 shows the monomer blend ratio, the α-amino acid content, the relative viscosity, the terminal amino group concentration, the glass transition temperature, and the melting point with respect to Polyamide Compound 1 to 19.

TABLE 1

(1/3)

| | | | unit | Production Example 1 | Production Example 2 | Production Example 3 | Production Example 4 | Production Example 5 | Production Example 6 | Production Example 7 |
|---|---|---|---|---|---|---|---|---|---|---|
| Polyamide No. | | | | 1 | 2 | 3 | 4 | 5 | 6 | 7 |
| Monomer Blend Ratio | Aromatic Diamine | m-xylylenediamine | mol % | 47.30 | 44.41 | 41.13 | 37.46 | 33.32 | 44.26 | 44.25 |
| | Alicyclic Diamine | 1,3-bisaminomethylcyclohexane | mol % | | | | | | | |
| | Aliphatic Diamine | hexamethylenediamine | mol % | | | | | | | |
| | Aliphatic Dicarboxylic Acid | adipic acid | mol % | 47.43 | 44.48 | 41.25 | 37.53 | 33.36 | 44.60 | 44.61 |
| | | sebacic acid | mol % | | | | | | | |
| | Aromatic Dicarboxylic Acid | isophthalic acid | mol % | | | | | | | |
| | α-Amino Acid | DL-alanine | mol % | 5.27 | 11.11 | 17.62 | 25.02 | 33.31 | | |
| | | DL-leucine | mol % | | | | | | 11.14 | |
| | | DL-valine | mol % | | | | | | | 11.14 |

TABLE 1-continued

| | | | unit | | | | | | |
|---|---|---|---|---|---|---|---|---|---|
| | Aminocarboxylic Acid | ε-caprolactam | mol % | | | | | | |
| α-Amino Acid Content | | | mol % | 5.3 | 11.0 | 17.6 | 25.1 | 33.1 | 11.1 | 11.0 |
| Properties | Relative Viscosity | | | 2.4 | 2.3 | 2.1 | 2.1 | 2 | 2.3 | 2.3 |
| | Terminal Group Concentration | [NH2] | μeq/g | 42 | 48 | 55 | 59 | 68 | 28 | 26 |
| | Thermal Properties | Glass Transition Temperature Tg | °C. | 86 | 84 | 83 | 82 | 81 | 84 | 84 |
| | | Melting Point Tm | °C. | 231 | 208 | N.D. | N.D. | N.D. | 209 | 209 |

(2/3)

| | | | unit | Production Example 8 | Production Example 9 | Production Example 10 | Production Example 11 | Production Example 12 | Production Example 13 |
|---|---|---|---|---|---|---|---|---|---|
| Polyamide No. | | | | 8 | 9 | 10 | 11 | 12 | 13 |
| Monomer Blend Ratio | Aromatic Diamine | m-xylylenediamine | mol % | 44.33 | 44.34 | 40.96 | 44.23 | 44.69 | 49.99 |
| | Alicyclic Diamine | 1,3-bisaminomethylcyclohexane | mol % | | | | | | |
| | Aliphatic Diamine | hexamethylenediamine | mol % | | | | | | |
| | Aliphatic Dicarboxylic Acid | adipic acid | mol % | | 38.97 | 41.33 | 44.63 | 44.26 | 50.01 |
| | | sebacic acid | mol % | 44.55 | | | | | |
| | Aromatic Dicarboxylic Acid | isophthalic acid | mol % | | 5.57 | | | | |
| | α-Amino Acid | DL-alanine | mol % | 11.12 | 11.12 | | 11.14 | 11.05 | |
| | | DL-leucine | mol % | | | 11.80 | | | |
| | | DL-valine | mol % | | | | | | |
| | Aminocarboxylic Acid | ε-caprolactam | mol % | | | 5.91 | | | |
| α-Amino Acid Content | | | mol % | 11.0 | 11.1 | 11.7 | 11.0 | 11.1 | 0.0 |
| Properties | Relative Viscosity | | | 2.2 | 2.2 | 2.3 | 2.4 | 2.4 | 2.4 |
| | Terminal Group Concentration | [NH2] | μeq/g | 41 | 43 | 25 | 19 | 86 | 50 |
| | Thermal Properties | Glass Transition Temperature Tg | °C. | 61 | 90 | 80 | 84 | 84 | 87 |
| | | Melting Point Tm | °C. | 178 | N.D. | 223 | 208 | 208 | 239 |

(3/3)

| | | | unit | Production Example 14 | Production Example 15 | Production Example 16 | Production Example 17 | Production Example 18 | Production Example 19 |
|---|---|---|---|---|---|---|---|---|---|
| Polyamide No. | | | | 14 | 15 | 16 | 17 | 18 | 19 |
| Monomer Blend Ratio | Aromatic Diamine | m-xylylenediamine | mol % | 49.78 | 50.20 | 33.24 | 33.28 | 44.11 | 40.99 |
| | Alicyclic Diamine | 1,3-bisaminomethylcyclohexane | mol % | | | 11.08 | | | |
| | Aliphatic Diamine | hexamethylenediamine | mol % | | | | 11.09 | | |
| | Aliphatic Dicarboxylic Acid | adipic acid | mol % | 50.22 | 49.80 | 44.56 | 44.51 | 44.72 | 41.34 |
| | | sebacic acid | mol % | | | | | | |
| | Aromatic Dicarboxylic Acid | isophthalic acid | mol % | | | | | | |
| | α-Amino Acid | DL-alanine | mol % | | | 11.13 | 11.11 | 11.17 | 17.66 |
| | | DL-leucine | mol % | | | | | | |
| | | DL-valine | mol % | | | | | | |
| | Aminocarboxylic Acid | ε-caprolactam | mol % | | | 11.0 | 11.0 | 10.9 | 17.5 |
| α-Amino Acid Content | | | mol % | 0.0 | 0.0 | 11.0 | 11.0 | 10.9 | 17.5 |
| Properties | Relative Viscosity | | | 2.4 | 2.3 | 2.1 | 2.2 | 1.5 | 1.6 |
| | Terminal Group Concentration | [NH2] | μeq/g | 16 | 88 | 45 | 49 | 83 | 82 |
| | Thermal Properties | Glass Transition Temperature Tg | °C. | 87 | 87 | 90 | 76 | 83 | 82 |
| | | Melting Point Tm | °C. | 239 | 239 | N.D. | N.D. | 208 | N.D. |

*N.D. = Not Detected

Examples 1 to 17, Comparative Examples 1 to 16

Production of Unstretched Single-Layer Film

Using a 30-mmφ double-screw extruder equipped with a T-die (by Plastic Engineering Laboratories), the polyamide compound, the transition metal compound and the oxidizing organic compound shown in Table 2 were dry-blended in the ratio shown therein, and further melt-kneaded at a cylinder/T-die temperature of (melting point of the polyamide compound+20° C.) to produce an unstretched single-layer film having a thickness of about 100 μm. The oxygen absorption of each film is shown in Table 2.

Examples 18 and 19

Production of Polyamide Powder

Using a laboratory blast mill (by Toyo Seiki), the polyamide compound and the transition metal compound shown in Table 2 were put into the apparatus in the ratio shown therein, and melt-kneaded at a resin temperature of (melting point of the polyamide compound+20° C.), and the kneaded mixture was taken out. After cooled, this was ground with a grinder, and 1 g of the ground powder was wrapped with medical paper. The oxygen absorption of each ground powder is shown in Table 2.

TABLE 2

(1/5)

| | | | unit | Example 1 | Example 2 | Example 3 | Example 4 | Example 5 | Example 6 | Example 7 |
|---|---|---|---|---|---|---|---|---|---|---|
| Composition | Polyamide | Production Example No. | | 1 | 1 | 2 | 3 | 4 | 5 | 6 |
| | | Blend Ratio | part by mass | 100 | 100 | 100 | 100 | 100 | 100 | 100 |
| | Transition Metal Compound | cobalt(II) stearate | part by mass | 0.11 | 0.21 | 0.21 | 0.32 | 0.32 | 0.32 | 0.21 |
| | | cobalt(II) acetate | part by mass | 0 | 0 | 0 | 0 | 0 | 0 | 0 |
| | | transition metal concentration | ppm | 100 | 200 | 200 | 300 | 300 | 300 | 200 |
| | Oxidizing Organic Compound | maleic acid-modified polybutadiene | part by mass | 0 | 0 | 0 | 0 | 0 | 0 | 0 |
| Properties | oxygen absorption | after stored for 7 days | cc/g | 11 | 13 | 13 | 15 | 15 | 16 | 12 |
| | | after stored for 14 days | cc/g | 24 | 26 | 26 | 31 | 32 | 34 | 25 |
| | | after stored for 28 days | cc/g | 40 | 44 | 45 | 52 | 54 | 57 | 43 |

(2/5)

| | | | unit | Example 8 | Example 9 | Example 10 | Example 11 | Example 12 | Example 13 |
|---|---|---|---|---|---|---|---|---|---|
| Composition | Polyamide | Production Example No. | | 7 | 8 | 9 | 10 | 11 | 12 |
| | | Blend Ratio | part by mass | 100 | 100 | 100 | 100 | 100 | 100 |
| | Transition Metal Compound | cobalt(II) stearate | part by mass | 0 | 0 | 0 | 0 | 0 | 0 |
| | | cobalt(II) acetate | part by mass | 0.06 | 0.06 | 0.06 | 0.06 | 0.06 | 0.06 |
| | | transition metal concentration | ppm | 200 | 200 | 200 | 200 | 200 | 200 |
| | Oxidizing Organic Compound | maleic acid-modified polybutadiene | part by mass | 0 | 0 | 0 | 0 | 0 | 0 |
| Properties | oxygen absorption | after stored for 7 days | cc/g | 12 | 10 | 11 | 9 | 14 | 12 |
| | | after stored for 14 days | cc/g | 24 | 20 | 22 | 18 | 29 | 25 |
| | | after stored for 28 days | cc/g | 41 | 34 | 38 | 30 | 49 | 43 |

(3/5)

| | | | unit | Example 14 | Example 15 | Example 16 | Example 17 | Example 18 | Example 19 |
|---|---|---|---|---|---|---|---|---|---|
| Composition | Polyamide | Production Example No. | | 2 | 3 | 16 | 17 | 18 | 19 |
| | | Blend Ratio | part by mass | 100 | 100 | 100 | 100 | 100 | 100 |
| | Transition Metal Compound | cobalt(II) stearate | part by mass | 0.42 | 0.32 | 0.21 | 0.21 | 0.21 | 0.21 |
| | | cobalt(II) acetate | part by mass | 0 | 0 | 0 | 0 | 0 | 0 |
| | | transition metal concentration | ppm | 400 | 300 | 200 | 200 | 200 | 200 |
| | Oxidizing Organic Compound | maleic acid-modified polybutadiene | part by mass | 0 | 3 | 0 | 0 | 0 | 0 |
| Properties | oxygen absorption | after stored for 7 days | cc/g | 15 | 23 | 12 | 12 | 25 | 31 |
| | | after stored for 14 days | cc/g | 31 | 49 | 25 | 26 | 48 | 60 |
| | | after stored for 28 days | cc/g | 52 | 69 | 35 | 37 | 62 | 77 |

TABLE 2-continued (4/5)

| | | | unit | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|---|---|
| Composition | Polyamide | Production Example No. | | 1 | 2 | 3 | 4 | 5 | 6 | 7 | 8 |
| | | Blend Ratio | part by mass | 100 | 100 | 100 | 100 | 100 | 100 | 100 | 100 |
| | Transition Metal Compound | cobalt(II) stearate | part by mass | 0 | 0 | 0 | 0 | 0 | 0 | 0 | 0 |
| | | cobalt(II) acetate | part by mass | 0 | 0 | 0 | 0 | 0 | 0 | 0 | 0 |
| | | transition metal concentration | ppm | 0 | 0 | 0 | 0 | 0 | 0 | 0 | 0 |
| | Oxidizing Organic Compound | maleic acid-modified polybutadiene | part by mass | 0 | 0 | 0 | 0 | 0 | 0 | 0 | 0 |
| Properties | oxygen absorption | after stored for 7 days | cc/g | 7 | 9 | 9 | 10 | 10 | 7 | 7 | 5 |
| | | after stored for 14 days | cc/g | 15 | 18 | 19 | 20 | 21 | 14 | 14 | 9 |
| | | after stored for 28 days | cc/g | 26 | 30 | 32 | 34 | 35 | 24 | 23 | 16 |

(5/5)

| | | | unit | Comparative Example 9 | Comparative Example 10 | Comparative Example 11 | Comparative Example 12 | Comparative Example 13 | Comparative Example 14 | Comparative Example 15 | Comparative Example 16 |
|---|---|---|---|---|---|---|---|---|---|---|---|
| Composition | Polyamide | Production Example No. | | 9 | 10 | 11 | 12 | 13 | 14 | 15 | 13 |
| | | Blend Ratio | part by mass | 100 | 100 | 100 | 100 | 100 | 100 | 100 | 100 |
| | Transition Metal Compound | cobalt(II) stearate | part by mass | 0 | 0 | 0 | 0 | 0.21 | 0.21 | 0.21 | 0.42 |
| | | cobalt(II) acetate | part by mass | 0 | 0 | 0 | 0 | 0 | 0 | 0 | 0 |
| | | transition metal concentration | ppm | 0 | 0 | 0 | 0 | 200 | 200 | 200 | 400 |
| | Oxidizing Organic Compound | maleic acid-modified polybutadiene | part by mass | 0 | 0 | 0 | 0 | 0 | 0 | 0 | 0 |
| Properties | oxygen absorption | after stored for 7 days | cc/g | 5 | 4 | 8 | 6 | 4 | 8 | 2 | 5 |
| | | after stored for 14 days | cc/g | 11 | 8 | 16 | 13 | 9 | 16 | 5 | 11 |
| | | after stored for 28 days | cc/g | 18 | 13 | 27 | 22 | 15 | 27 | 8 | 19 |

The polyamide compositions of the present invention of Examples 1 to 19, in which an α-amino acid-copolymerized polyamide is used as the polyamide compound (A), are noticeably excellent in oxygen absorbability as compared with those of Comparative Examples 13 to 16, in which a polyamide not copolymerized with an α-amino acid is used. Specifically, the polyamide compositions of the present invention are excellent in oxygen absorbability since the polyamide compound (A) itself therein has sufficient oxygen absorption performance. In addition, the polyamide compositions of the present invention of Examples 1 to 19, which contain a transition metal compound (B), are excellent in oxygen absorbability as compared with those of Comparative Examples 1 to 12 not containing such a transition metal compound.

From another standpoint, the polyamide compositions of the present invention can exhibit sufficient oxygen absorption performance though containing a smaller amount of a transition metal compound, as compared with conventional polyamide compositions. Accordingly, in the compositions of the present invention, the risk of release of the transition metal compound can be reduced, and the resin compositions can be prevented from being colored by the transition metal compound therein.

Further, the results in Table 2 confirm the following:

As in Examples 1 to 5, the compositions having a higher α-amino acid content are more excellent in oxygen absorbability.

As in Examples 1 and 2, when the amount of the transition metal compound is increased from 100 ppm to 200 ppm, the oxygen absorption performance of the composition is further enhanced. As in Examples 3 and 14, when the amount of the transition metal compound is increased from 200 ppm to 400 ppm, the oxygen absorption performance of the composition is further enhanced.

As in Examples 4 and 15, when the oxidizing organic compound (C) is added, then the oxygen absorption performance of the composition is further enhanced.

Comparative Examples 13 to 15 are compared with each other. In the oxygen-absorbing resin composition prepared by adding a transition metal compound to polymetaxylylenadipamide according to a conventional art, when the terminal amino group concentration is higher, then the oxygen absorption performance of the composition noticeably lowers. On the other hand, Examples 3, 12 and 13 are compared with each other. The oxygen absorption of the polyamide composition of the present invention is influenced little by the terminal amino group concentration in the polyamide compound in the composition.

As in Examples 18 and 19, the compositions still exhibit excellent oxygen absorbability even though the polyamide compound therein is a polyamide oligomer.

INDUSTRIAL APPLICABILITY

The polyamide composition of the present invention is excellent in oxygen absorption performance. When the polyamide composition is used for wrapping materials or packaging containers, then it exhibits sufficient oxygen absorption performance not worsening the transparency of resin; and the present invention provides wrapping materials and packaging containers capable of keeping contents therein in a good condition.

The invention claimed is:

1. A polyamide composition, comprising: (A) a polyamide compound comprising from 25 to 50% by mol of a diamine unit comprising at least one diamine unit selected from the group consisting of an aromatic diamine of formula (I-1), an alicyclic diamine unit of formula (I-2), and a linear aliphatic diamine unit of formula (I-3), in an amount in total of 50% by mol or more, from 25 to 50% by mol of a dicarboxylic acid unit comprising a linear aliphatic dicarboxylic acid unit of formula (II-1) and/or an aromatic dicarboxylic acid unit of formula (II-2), in an amount in total of 50% by mol or more, and from 0.1 to 50% by mol of a constitutional unit of formula (III):

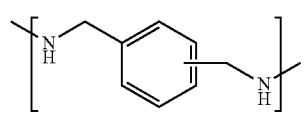 (I-1)

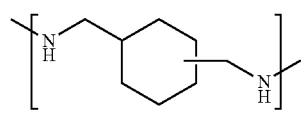 (I-2)

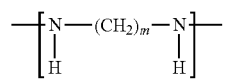 (I-3)

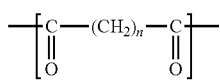 (II-1)

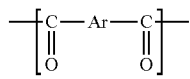 (II-2)

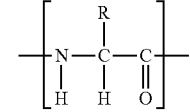 (III)

wherein:
in formula (I-3), m is an integer of from 2 to 18;
in formula (II-1), n is an integer of from 2 to 18;
in formula (II-2), Ar is an arylene group; and
in formula (III), R is a substituted or unsubstituted alkyl group or a substituted or unsubstituted aryl group; and
(B) a transition metal compound.

2. The polyamide compound of claim 1, wherein R in formula (III) is a substituted or unsubstituted alkyl group comprising from 1 to 6 carbon atoms or a substituted or unsubstituted aryl group comprising from 6 to 10 carbon atoms.

3. The polyamide composition of claim 1, comprising the transition metal compound (B) in an amount of from 10 to 800 ppm in terms of the metal atom concentration therein.

4. The polyamide composition of claim 1, wherein the transition metal compound (B) is cobalt(II) stearate or cobalt (II) acetate.

5. The polyamide composition of claim 1, further comprising:
(C) an oxidizing organic compound in an amount of from 0.01 to 10% by mass.

6. The polyamide composition of claim 5, wherein the oxidizing organic compound (C) is a polyene oligomer and/or polymer modified with an acid and/or an acid anhydride.

7. The polyamide composition of claim 1, wherein the diamine unit comprises a m-xylylenediamine unit in an amount of 50% by mol or more.

8. The polyamide composition of claim 1, wherein the linear aliphatic dicarboxylic acid unit comprises at least one selected from a group consisting of an adipic acid unit, a sebacic acid unit, and a 1,12-dodecanedicarboxylic acid unit, in an amount in total of 50% by mol or more.

9. The polyamide composition of claim 1, wherein the aromatic dicarboxylic acid unit comprises at least one selected from a group consisting of an isophthalic acid unit, a terephthalic acid unit, and a 2,6-naphthalenedicarboxylic acid unit, in an amount in total of 50% by mol or more.

10. The polyamide composition of claim 1, wherein the polyamide compound (A) further comprises an ω-aminocarboxylic acid unit of formula (X) in an amount of from 0.1 to 49.9% by mol based on the total constitutional units of the polyamide compound (A):

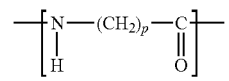 (X)

wherein, in formula (X), p is an integer of from 2 to 18.

11. The polyamide composition of claim 10, wherein the ω-aminocarboxylic acid unit comprises a 6-aminohexanoic acid unit and/or a 12-aminododecanoic acid unit in an amount in total of 50% by mol or more.

* * * * *